(12) United States Patent
Akahane et al.

(10) Patent No.: US 6,997,027 B2
(45) Date of Patent: Feb. 14, 2006

(54) FORGING PUNCH

(75) Inventors: Fujio Akahane, Nagano (JP); Nagamitsu Takashima, Nagano (JP); Akiharu Kurebayashi, Nagano (JP); Kazushige Hakeda, Nagano (JP); Ryoji Uesugi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/644,091

(22) Filed: Aug. 20, 2003

(65) Prior Publication Data

US 2004/0112110 A1 Jun. 17, 2004

(51) Int. Cl.
B21D 28/10 (2006.01)

(52) U.S. Cl. .................... 72/325; 29/890.142
(58) Field of Classification Search ............. 72/325, 72/414, 385; 29/890.142, 890.143
See application file for complete search history.

(56) References Cited

U.S. PATENT DOCUMENTS

| | | | | |
|---|---|---|---|---|
| 35,496 A | * | 6/1862 | Montgomery | |
| 2,000,208 A | * | 5/1935 | Balfe | 72/39 |
| 3,665,745 A | * | 5/1972 | Bion | 72/186 |
| 3,698,222 A | * | 10/1972 | Blake | 72/129 |
| 4,434,637 A | * | 3/1984 | Bailey | 72/18.5 |
| 4,450,705 A | * | 5/1984 | Vidal-Meza | 72/379.6 |
| 4,598,569 A | * | 7/1986 | Carroll et al. | 72/325 |

* cited by examiner

*Primary Examiner*—Daniel C. Crane
(74) *Attorney, Agent, or Firm*—Sughrue Mion, PLLC

(57) ABSTRACT

There is disclosed a punch for forging a metallic plate member. A first die is adapted to be opposed to a first face of the plate member. A second die is adapted to be opposed to a second face of the plate member. A plurality of first projections are provided on the first die and arranged in a first direction with a fixed pitch. Each of the first projections is elongated in a second direction perpendicular to the first direction. A plurality of second projections are provided on the second die and arranged in the first direction with the fixed pitch. Each of the second projections is elongated in the second direction and provided with a concave portion extending in the second direction at a distal end portion thereof. The plate member is sandwiched between the first die and the second die so that the first projections and the second projections are cut into the plate member in a third direction orthogonal to the first direction and the second direction, to perform a first forging work.

23 Claims, 18 Drawing Sheets

FORGING PUNCH

BACKGROUND OF THE INVENTION

The present invention relates to a forging punch to be used for manufacturing a component such as a liquid ejection head. The present invention also relates to a minute forging method and a method of manufacturing a liquid ejection head using the same.

Forging work is used in various fields of products. For example, it is thought that a pressure generating chamber of a liquid ejection head is molded by forging metal material. The liquid ejection head ejects pressurized liquid from a nozzle orifice as a liquid droplet, and the heads for various liquids have been known. An ink jet recording head is representative of the liquid ejection head. Here, the related art will be described with the ink jet recording head as an example.

An ink jet recording head (hereinafter, referred to as "recording head") used as an example of a liquid ejection head is provided with a plurality of series of flow paths reaching nozzle orifices from a common ink reservoir via pressure generating chambers in correspondence with the orifices. Further, the respective pressure generating chambers need to form by a fine pitch in correspondence with a recording density to meet a request of downsizing. Therefore, a wall thickness of a partition wall for partitioning contiguous ones of the pressure generating chambers is extremely thinned. Further, an ink supply port for communicating the pressure generating chamber and the common ink reservoir is more narrowed than the pressure generating chamber in a flow path width thereof in order to use ink pressure at inside of the pressure generating chamber efficiently for ejection of ink drops.

According to a related-art recording head, a silicon substrate is preferably used in view of fabricating the pressure generating chamber and the ink supply port having such small-sized shapes with excellent dimensional accuracy. That is, a crystal surface is exposed by anisotropic etching of silicon and the pressure generating chamber or the ink supply port is formed to partition by the crystal surface.

Further, a nozzle plate formed with the nozzle orifice is fabricated by a metal board from a request of workability or the like. Further, a diaphragm portion for changing a volume of the pressure generating chamber is formed into an elastic plate. The elastic plate is of a two-layer structure constituted by pasting together a resin film onto a supporting plate made of a metal and is fabricated by removing a portion of the supporting plate in correspondence with the pressure generating chamber. Such a structure is disclosed in Japanese Patent Publication No. 2000-263799A, for example.

Since the thickness of the partition wall is extremely thinned, it is hard to accurately obtain the recessed shape of the pressure generating chamber to uniformly set the liquid containing volume thereof. Since the recessed shape is generally elongated in many cases, the length of the partition wall is accordingly increased. For this reason, it is important that the partition wall is to be accurately fabricated over an entire length in order to uniformly maintain the liquid containing volume. In particular, it is important that the height of the partition wall is sufficiently maintained in a manufacturing stage in order to obtain proper recessed shapes of adjacent pressure generating chambers.

Meanwhile, according to the above-described related-art recording head, since a difference between linear expansion rates of silicon and the metal is large, in pasting together respective members of the silicon board, the nozzle plate and the elastic plate, it is necessary to adhere the respective members by taking a long time period under relatively low temperature. Therefore, enhancement of productivity is difficult to achieve to bring about a factor of increasing fabrication cost. Therefore, there has been tried to form the pressure generating chamber at the board made of the metal by plastic working, however, the working is difficult since the pressure generating chamber is extremely small and the flow path width of the ink supply port needs to be narrower than the pressure generating chamber to thereby pose a problem that improvement of production efficiency is difficult to achieve.

SUMMARY OF THE INVENTION

It is therefore an object of the invention to precisely form a partition wall to obtain recessed shapes of adjacent pressure generating chambers with high precision.

In order to achieve the above object, according to the invention, there is provided a punch for forging a metallic plate member, comprising:

a first die, adapted to be opposed to a first face of the plate member, a second die, adapted to be opposed to a second face of the plate member;

a plurality of first projections, provided on the first die and arranged in a first direction with a fixed pitch, each of the first projections being elongated in a second direction perpendicular to the first direction; and a plurality of second projections, provided on the second die and arranged in the first direction with the fixed pitch, each of the second projections being elongated in the second direction and provided with a concave portion extending in the second direction at a distal end portion thereof, wherein the plate member is sandwiched between the first die and the second die so that the first projections and the second projections are cut into the plate member in a third direction orthogonal to the first direction and the second direction, to perform a first forging work.

The material in the plate member is pressurized between both of the dies are caused to flow to be pushed into the gaps between the first projections. Incidentally, at portions on both sides of the concave portion, an interval between both of the dies is smaller than the portion where the concave portion is provide, so that an amount of the pressurization of the material is increased. The material thus pressurized is caused to flow to be pushed out in the second direction and the material is moved toward the concave portion at which the interval between both of the dies becomes large so that an amount of the pressurization becomes small. In other words, the concave portion serves to provide a place into which the material escapes.

Accordingly, the flow of the material into the gaps is positively carried out over the whole region in the second direction of the gaps. Moreover, since the projections are arranged at the fixed pitch, the flow of the material in the first direction is made uniform for both the direction of the flow and the amount of the flow.

In a case where the material flowing in the gaps become partition walls of the recesses formed by the first projections, the shape of the recesses can be obtained accurately. Furthermore, since the processing can be carried out to cause the volume of each recess to be uniform, in a case where the pressure generating chamber for the liquid ejection head is to be formed, for example, the ejection property of the liquid ejection head is stabilized.

Preferably, the second die is arranged such that each of the second projections is opposed to a gap defined between adjacent ones of the first projections. In this case, the height of the second projections can be efficiently used to cause the material to flow into the gaps between the first projections.

Alternatively, the second die may be arranged such that each of the second projections is opposed to an associated one of the first projections. In this case, the pressurizing force can be maximized between the first and second projections to promote the material flow into the gaps between the first projections.

Preferably, the concave portion is arranged at a center portion of each of the second projections with regard to the second direction. In this case, the amount of material flow from both sides of the concave portion can be made equal.

Preferably, the concave portion has an arcuate shape when viewed from the first direction. In this case, the material can be smoothly flown into the concave portion.

Alternatively, the concave portion may be formed with a plurality of flat faces.

Alternatively, a convex portion is formed on a bottom portion of the concave portion. In this case, it is prevented the stress from concentrating the bottom portion, which otherwise cause to generate a crack at the bottom portion.

Here, it is preferable that the convex portion has a height such an extent that a plurality of concave portions are substantially defined by the convex portion. In this case, a plurality of portions in which the amount of the pressurization is large and small are provided alternately so that the amount of the material flowing to the gaps can be further made uniform in the second direction.

In order to the same advantages, instead of the convex portion, a recess portion may be formed at a bottom portion of the concave portion.

Preferably, a length of the concave portion in the second direction is ⅔ or less of a length of each of the second projections in the second direction. In this case, the amount of the flow of the material in the second direction and the size of the concave portion for receiving the same amount can be balanced properly with a pressurizing stroke. Thus, the flow of the material into the gaps is optimized.

In order to attain the same advantage, it is preferable that a ratio of a depth of the concave portion with respect to a length of the concave portion in the second direction falls within a range of 0.05 to 0.3.

In order to attain the same advantage, a ratio of a depth of the concave portion with respect to a height of each of the second projections falls within a range of 0.5 to 1.

Preferably, at least the concave portion of each of the second projections is finished with either mirror finishing or chromium plating. In this case, the material flow into the gaps between the first projections can be promoted.

Preferably, each of the second projections has a wedge-shaped cross section when viewed from the second direction. In this case, the second projections can be surely cut into the plate member.

Here, it is preferable that a distal end angle of the wedge-shaped cross section is 90 degrees or less.

Preferably, the fixed pitch is 0.3 mm or less. For forming such a minute structure, an anisotropic etching method is generally employed. Since such a method requires a large processing man-hour, it is disadvantageous in respect of the manufacturing cost. However, the forging punch of the invention can be applied to obtain such a minute structure to considerably reduce the manufacturing cost.

Preferably, the punch further comprises a third die, adapted to be opposed to the second face of the plate member on which the first forging work has been performed. The plate member is sandwiched between the first die and the third die so that only the first projections are cut into the plate member in the third direction, to perform a second forging work.

Here, it is preferable that: the third die is formed with a pair of third projections arranged in the second direction and elongated in the first direction so as to define a groove therebetween; and each of the third projections has a flat distal end face. In this case, since the material flown into the gaps between the first projections is further pressurized by the flat faces, the height of the material to be partition walls are made uniform entirely in the first and second directions.

It is also preferable that the concave portion in the second die and the groove in the third die are placed at a same position with respect to the plate member in connection with the second direction. In this case, since the protrusion formed by the concave portion on the second face of the plate member is received by the groove, the material at the protrusion never flows into the gaps between the first projections so that it contributes the uniformization of the partition wall height.

It is also preferable that sloped flat faces continued from the flat distal end face are provided at both end portions in the first direction of each of the third projections, such that a portion closer to an end in the first direction of each of the third projections is more separated from the first die.

The material flows in the first direction little by little from the central part toward the both ends so that the vicinity of the ends of the plate member are made thick due to the accumulation of the plastic flow. With the above configuration, since the thick portions are pressurized by the sloped faces which are lowered, the material in the thick portions can be prevented from excessively flowing into the gaps. Accordingly, the amount of the flow of the material can be as uniform as possible in all the gaps.

It is also preferable that a depth of the groove falls within a range of 0.05 mm to 0.15 mm, and a length in the second direction of the groove falls within a range of 0.5 mm to 1 mm. In this case, the amount of the flow of the material in the second direction and the size of the groove for receiving the same amount can be balanced properly with a pressurizing stroke. Thus, the flow of the material into the gaps is optimized.

Preferably, the second die and the third die are arranged such that the first forging work and the second forging work are performed in a progressive manner. In this case, the positioning operation of the worked object in each stage can be precisely performed so that the molding accuracy is enhanced, so that the forging works can be efficiently conducted.

According to the invention, there is also provided a forging apparatus comprising the above forging punch.

According to the invention, there is also provided a method of forging a metallic plate member, comprising steps of:

providing a first die, in which a plurality of first projections are arranged in a first direction with a fixed pitch, each of the first projections being elongated in a second direction perpendicular to the first direction;

providing a second die, in which a plurality of second projections are arranged in the first direction with the fixed pitch, each of the second projections being elongated in the second direction and provided with a concave portion extending in the second direction at a distal end portion thereof;

providing a third die, in which a pair of third projections arranged in the second direction and elongated in the first direction so as to define a groove therebetween, each of the third projections having a flat distal end face;

opposing the first die to a first of the plate member while opposing the second die to a second face of the plate member;

performing a first forging work by sandwiching the plate member with the first die and the second die in a third direction orthogonal to the first direction and the second direction, so as to generate a plastic flow of a material in the plate member into gaps defined between the first projections while generating a plastic flow of the material into the concave portion of each of the second projection;

opposing the third die to the second face of the plate member, after the first forging work; and performing a second forging work, by sandwiching the plate member with the first die and the third die in the third direction, such that the flat distal end face of each of the third projections generates a plastic flow of the material into the gaps between the first projections, while a protrusion formed on the plate member by the concave portion is received by the groove, wherein a plurality of recesses formed by the first projections are partitioned by partition walls formed by the material flown into the gaps between the first projections.

According to the invention, there is also provide a method of manufacturing a liquid ejection head, using the above forging method, comprising steps of:

forming a through hole in each of the recesses so as to communicate each of the recesses with the second face of the plate member;

joining a sealing plate onto the first face of the plate member so as to seal the recesses;

providing a metallic nozzle plate formed with a plurality of nozzles; and joining the nozzle plate, with an adhesive agent, onto the second face of the plate member such that each of the nozzles is communicated with an associated one of the recesses via the through hole, wherein the liquid ejection head is configured such that liquid droplets are ejected from the nozzles by pressure fluctuation generated in liquid contained in the recesses.

As described above, the recess portions elongated in the second direction and arranged side by side in the first direction are obtained with the partition walls finished precisely. The formation requires a less processing man-hour than that in the anisotropic etching method. Furthermore, the processing can be carried out to cause the volume of each recess to be uniform. Therefore, the manufacturing method is optimum for forming the minute pressure generating chambers of the liquid ejection head in which the ejection property is stabilized.

Preferably, a plurality of dents formed by the second projections and remained on the second face of the plate member are used to receive excess adhesive agent when the nozzle plate is joined onto the second face of the plate member.

In this case, the thickness of the adhesive layer is optimized for enhancing a bonding strength between the plate member (chamber formation plate) and the nozzle plate.

Preferably, a height of one of the flat distal end faces of the third projections which is closer to a portion where the through hole is to be formed is lower than the other one of the flat distal end faces. In this case, an amount of the material pressed by the one flat face closer to the through hole is smaller than that of the material pressed by the other flat face, so that a density or hardness of the material closer to the through hole are lower than those of the other side. Accordingly, the work resistance acting on a punch used for forming of the through is reduced, so that durability of the punch is improved, and this feature is advantageous in improving the working accuracy of the through hole.

According to the invention, there is also provided a liquid ejection head manufactured by the above method, wherein a plurality of dents are arranged on the second face of the plate member with the fixed pitch.

Since the pitch of the dents is substantially equal to that of the pressure generating chambers in the first direction, the dents are distributed at regular spatial intervals on the second face. As a result, the dents uniformly receives the excessive adhesive agent, the thickness of the adhesive layer is optimized over a broad area, so that the bonding strength is increased.

Here, it is preferable that each of the dents is formed in the vicinity of the through hole. In this case, since the excessive adhesive agent is received by the dent near the through hole, no adhesive agent overflows from the dent into a passage space of the through hole. Accordingly, there is no chance that air bubbles stay at the locations where the adhesive agent overflows, so that a preferable ink flow is secured.

Preferably, the plate member is comprised of nickel. In this case, the coefficients of linear expansion of the chamber formation plate, the sealing plate and the nozzle plate constituting the flow path unit are almost equal to each other. When these members are heated and bonded to each other, therefore, each of them expands evenly. Consequently, a mechanical stress such as a warpage caused by a difference in the coefficient of expansion is generated with difficulty. As a result, each member can be bonded without a hindrance even if a bonding temperature is set to be high. Even if a piezoelectric vibrator generates heat when the recording head is operated and the flow path unit is heated, each member constituting the flow path unit expands evenly. For this reason, even if the heating and the cooling are repetitively carried out by the operation of the recording head and the stop of the operation respectively, a drawback such as a separation is caused over each member constituting the flow path unit with difficulty.

BRIEF DESCRIPTION OF THE DRAWINGS

The above objects and advantages of the present invention will become more apparent by describing in detail preferred exemplary embodiments thereof with reference to the accompanying drawings, wherein:

FIG. 12D is a sectional view taken along a line D—D in FIG. 12C;

DETAILED DESCRIPTION OF THE INVENTION

Embodiments of the invention will be described below with reference to the accompanying doings. Firstly, the constitution of a liquid ejection head will be described.

Since it is preferable to apply the invention to a recording head of an ink jet recording apparatus, as an example representative of the liquid ejection head, the above recording head is shown in the embodiment.

Figure 1:
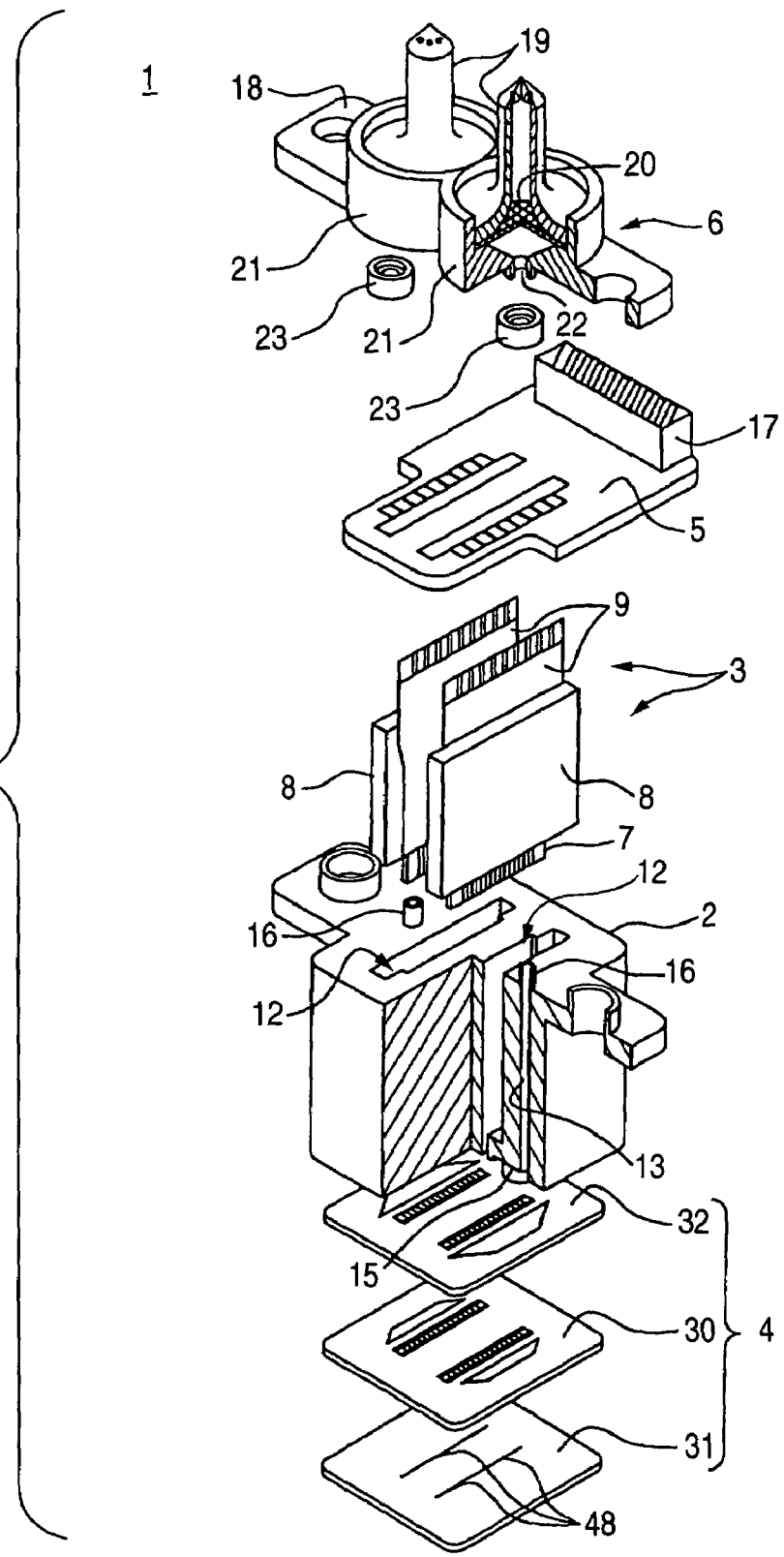
FIG. 1 is a perspective view of a disassembled ink jet recording head according to a first example.
Figure 2:
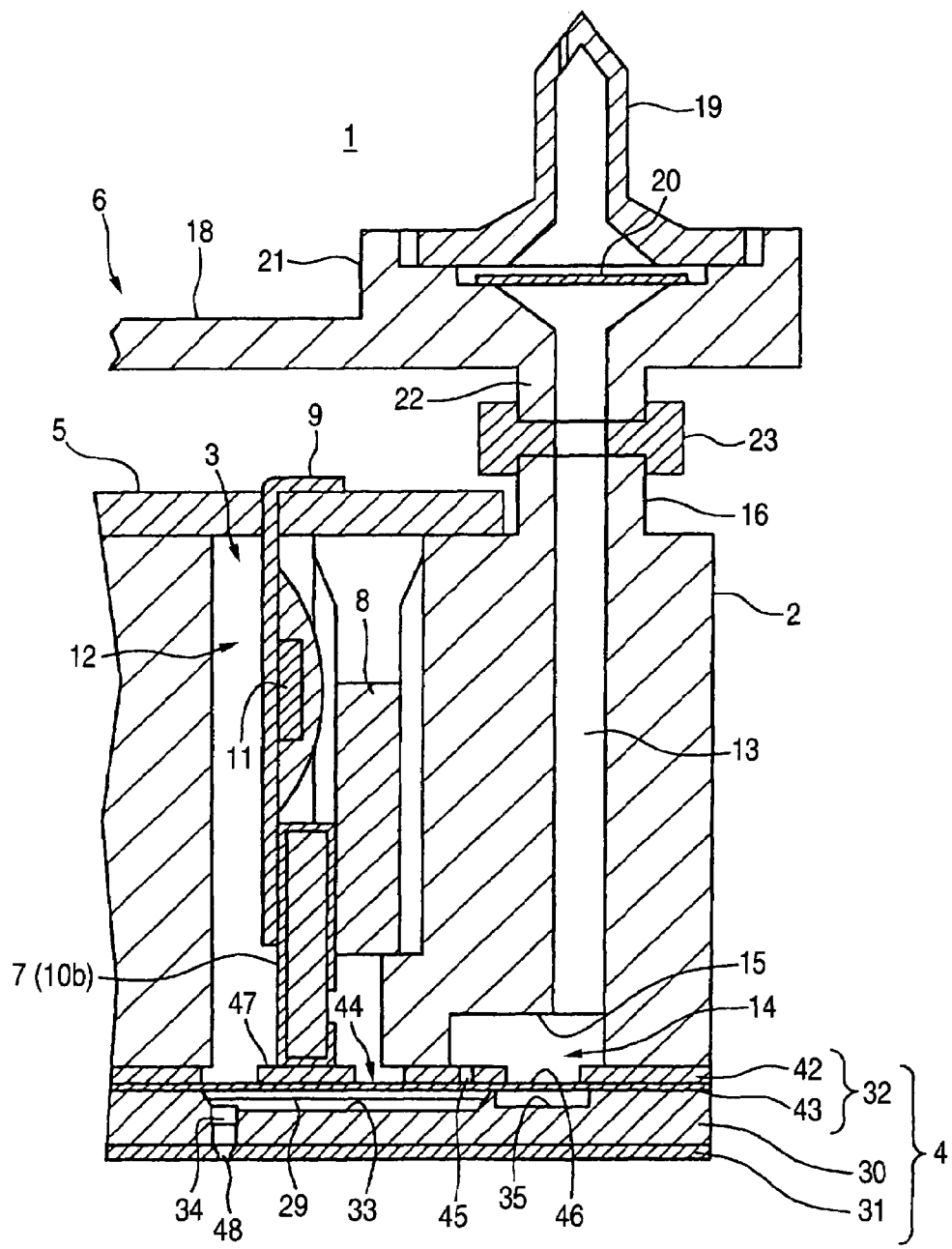
FIG. 2 is a sectional view of the ink jet recording head.

As shown in FIGS. 1 and 2, a recording head 1 is roughly constituted by a casing 2, a vibrator unit 3 contained at inside of the casing 2, a flow path unit 4 bonded to a front end face of the casing 2, a connection board 5 arranged onto a rear end face of the casing 2, a supply needle unit 6 attached to the rear end face of the casing 2.

Figure 3A:
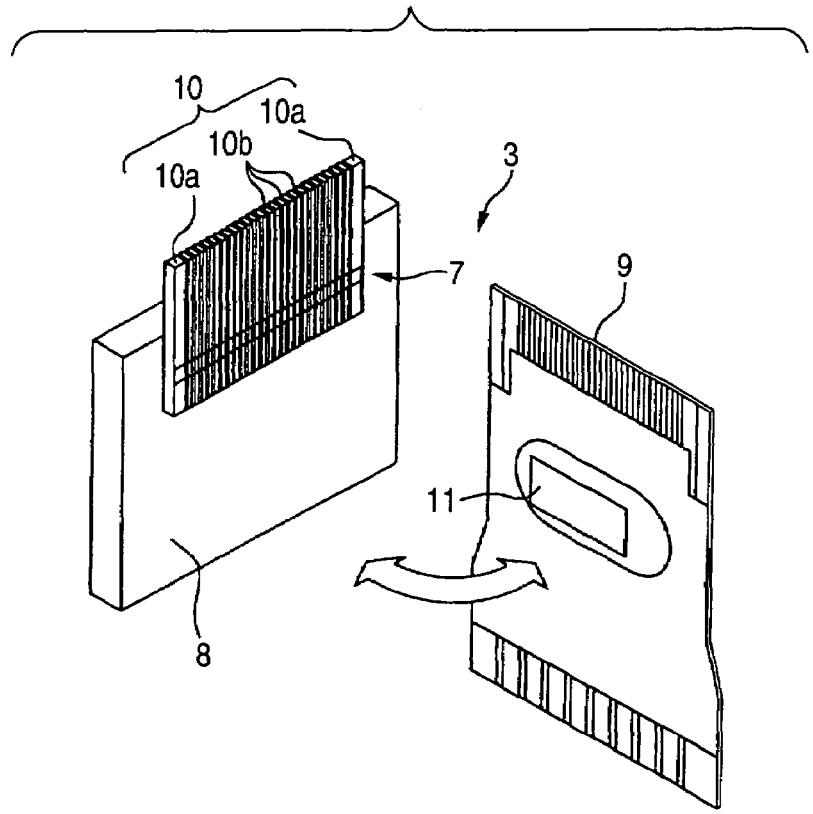
FIGS. 3A and 3B are views for explaining a vibrator unit.
Figure 3B:
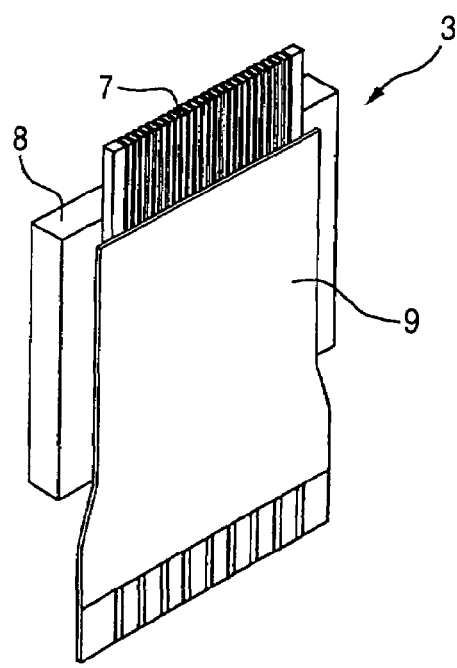

As shown in FIGS. 3A and 3B, the vibrator unit 3 is roughly constituted by a piezoelectric vibrator group 7, a fixation plate 8 bonded with the piezoelectric vibrator group 7 and a flexible cable 9 for supplying a drive signal to the piezoelectric vibrator group 7.

The piezoelectric vibrator group 7 is provided with a plurality of piezoelectric vibrators 10 formed in a shape of a row. The respective piezoelectric vibrators 10 are constituted by a pair of dummy vibrators 10a disposed at both ends of the row and a plurality of drive vibrators 10b arranged between the dummy vibrators 10a. Further, the respective drive vibrators 10b are cut to divide in a pectinated shape having an extremely slender width of, for example, about 50 $\mu$m through 100 $\mu$m, so that 180 pieces are provided.

Further, the dummy vibrator 10a is provided with a width sufficiently wider than that of the drive vibrator 10b and is provided with a function for protecting the drive vibrator 10b against impact or the like and a guiding function for positioning the vibrator unit 3 at a predetermined position.

A free end portion of each of the piezoelectric vibrators 10 is projected to an outer side of a front end face of the fixation plate 8 by bonding a fixed end portion thereof onto the fixation plate 8. That is, each of the piezoelectric vibrators 10 is supported on the fixation plate 8 in a cantilevered manner. Further, the free end portions of the respective piezoelectric vibrators 10 are constituted by alternately laminating piezoelectric bodies and inner electrodes so that extended and contracted in a longitudinal direction of the elements by applying a potential difference between the electrodes opposed to each other.

The flexible cable 9 is electrically connected to the piezoelectric vibrator 10 at a side face of a fixed end portion thereof constituting a side opposed to the fixation plate 8. Further, a surface of the flexible cable 9 is mounted with an IC 11 for controlling to drive the piezoelectric vibrator 10 or the like. Further, the fixation plate 8 for supporting the respective piezoelectric vibrators 10 is a plate-like member having a rigidity capable of receiving reaction force from the piezoelectric vibrators 10, and a metal plate of a stainless steel plate or the like is preferably used therefor.

The casing 2 is a block-like member molded by a thermosetting resin of an epoxy species resin or the like. Here, the casing 2 is molded by the thermosetting resin because the thermosetting resin is provided with a mechanical strength higher than that of a normal resin, a linear expansion coefficient is smaller than that of a normal resin so that deformability depending on the environmental temperature is small. Further, inside of the casing 2 is formed with a container chamber 12 capable of containing the vibrator unit 3, and an ink supply path 13 constituting a portion of a flow path of ink. Further, the front end face of the casing 2 is formed with a recess 15 for constituting a common ink reservoir 14.

The container chamber 12 is a hollow portion having a size of capable of containing the vibrator unit 3. At a portion of a front end side of the container chamber 12, a step portion is formed such that a front end face of the fixation plate 8 is brought into contact therewith. The recess 15 is formed by partially recessing the front end face of the casing 2 so has to have a substantially trapezoidal shape formed at left and right outer sides of the container chamber 12.

The ink supply path 13 is formed to penetrate the casing 2 in a height direction thereof so that a front end thereof communicates with the recess 15. Further, a rear end portion of the ink supply path 13 is formed at inside of a connecting port 16 projected from the rear end face of the casing 2.

The connection board 5 is a wiring board formed with electric wirings for various signals supplied to the recording head 1 and provided with a connector 17 capable of connecting a signal cable. Further, the connection board 5 is arranged on the rear end face of the casing 2 and connected with electric wirings of the flexible cable 9 by soldering or the like. Further, the connector 17 is inserted with a front end of a signal cable from a control apparatus (not illustrated).

The supply needle unit 6 is a portion connected with an ink cartridge (not illustrated) and is roughly constituted by a needle holder 18, an ink supply needle 19 and a filter 20.

The ink supply needle 19 is a portion inserted into the ink cartridge for introducing ink stored in the ink cartridge. A distal end portion of the ink supply needle 19 is sharpened in a conical shape to facilitate to insert into the ink cartridge. Further, the distal end portion is bored with a plurality of ink introducing holes for communicating inside and outside of the ink supply needle 19. Further, since the recording head according to the embodiment can eject two kinds of inks, two pieces of the ink supply needles 19 are provided.

The needle holder 18 is a member for attaching the ink supply needle 19, and a surface thereof is formed with base seats 21 for two pieces of the ink supply needles 19 for fixedly attaching proximal portions of the ink supply needles 19. The base seat 21 is fabricated in a circular shape in compliance with a shape of a bottom face of the ink supply needle 19. Further, a substantially central portion of the bottom face of the base seat is formed with an ink discharge port 22 penetrated in a plate thickness direction of the needle holder 18. Further, the needle holder 18 is extended with a flange portion in a side direction.

The filter 20 is a member for hampering foreign matters at inside of ink such as dust, burr in dieing and the like from passing therethrough and is constituted by, for example, a metal net having a fine mesh. The filter 20 is adhered to a filter holding groove formed at inside of the base seat 21.

Further, as shown in FIG. 2, the supply needle unit 6 is arranged on the rear end face of the casing 2. In the arranging state, the ink discharge port 22 of the supply needle unit 6 and the connecting port 16 of the casing 2 are communicated with each other in a liquid tight state via a packing 23.

Next, the above-described flow path unit 4 will be explained. The flow path unit 4 is constructed by a constitution in which a nozzle plate 31 is bonded to one face of a chamber formation plate 30 and an elastic plate 32 is bonded to other face of the chamber formation plate 30.

Figure 4:
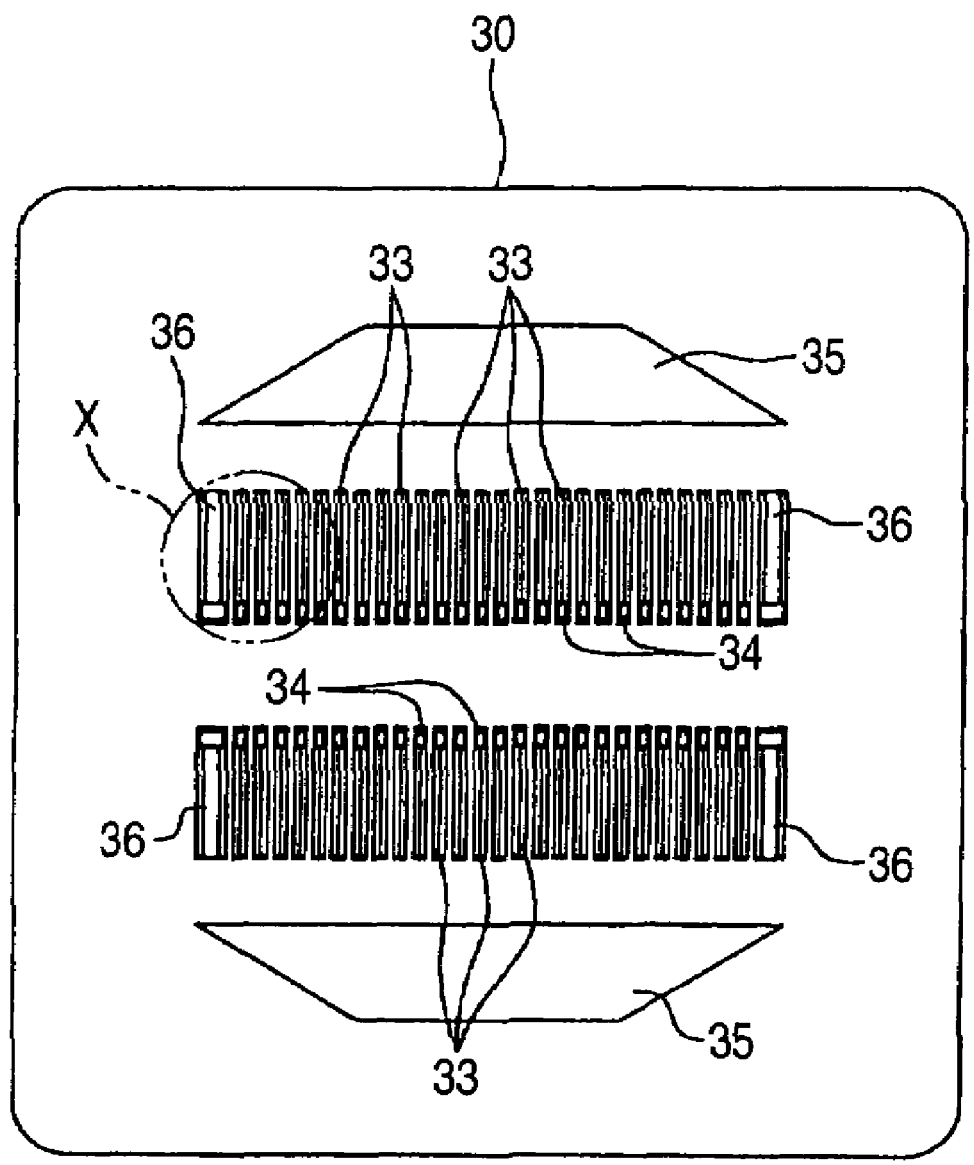
FIG. 4 is a plan view of a chamber formation plate.

As shown in FIG. 4, the chamber formation plate 30 is a plate-like member made of a metal formed with an elongated recess portion 33, a communicating port 34 and an escaping recess portion 35. According to the embodiment, the chamber formation plate 30 is fabricated by working a metal substrate made of nickel having a thickness of 0.35 mm.

An explanation will be given here of reason of selecting nickel of the metal substrate. First reason is that the linear expansion coefficient of nickel is substantially equal to a linear expansion coefficient of a metal (stainless steel in the embodiment as mentioned later) constituting essential portions of the nozzle plate 31 and the elastic plate 32. That is, when the linear expansion coefficients of the chamber formation plate 30, the elastic plate 32 and the nozzle plate 31 constituting the flow path unit 4 are substantially equal, in heating and adhering the respective members, the respective members are uniformly expanded.

Therefore, mechanical stress of warping or the like caused by a difference in the expansion rates is difficult to generate. As a result, even when the adhering temperature is set to high temperature, the respective members can be adhered to each other without trouble. Further, even when the piezoelectric vibrator 10 generates heat in operating the recording head 1 and the flow path unit 4 is heated by the heat, the respective members 30, 31 and 32 constituting the flow path unit 4 are uniformly expanded. Therefore, even when heating accompanied by activating the recording head 1 and cooling accompanied by deactivating are repeatedly carried out, a drawback of exfoliation or the like is difficult to be brought about in the respective members 30, 31 and 32 constituting the flow path unit 4.

Second reason is that nickel is excellent in corrosion resistance. That is, aqueous ink is preferably used in the recording head 1 of this kind, it is important that alteration of rust or the like is not brought about even when the recording head 1 is brought into contact with water over a long time period. In this respect, nickel is excellent in corrosion resistance similar to stainless steel and alteration of rust or the like is difficult to be brought about.

Third reason is that nickel is rich in ductility. That is, in manufacturing the chamber formation plate 30, as mentioned later, the fabrication is carried out by plastic working (for example, forging). Further, the elongated recess portion 33 and the communicating port 34 formed in the chamber formation plate 30 are of extremely small shapes and high dimensional accuracy is requested therefor. When nickel is used for the metal substrate, since nickel is rich in ductility, the elongated recess portion 33 and the communicating port 34 can be formed with high dimensional accuracy even by plastic working.

Further, with regard to the chamber formation plate 30, the chamber formation plate 30 may be constituted by a metal other than nickel when the condition of the linear expansion coefficient, the condition of the corrosion resistance and the condition of the ductility are satisfied.

Figure 5A:
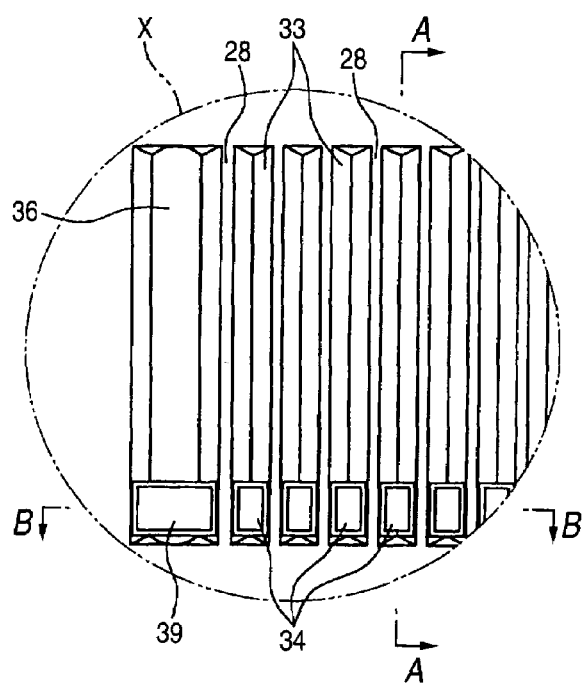
FIG. 5A is a view enlarging an X portion in FIG. 4.
Figure 5B:
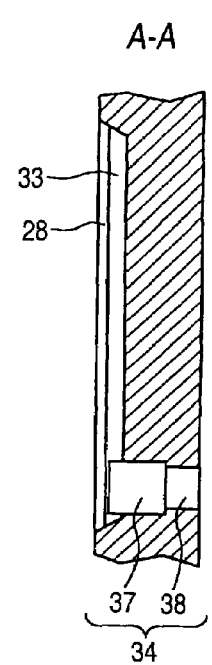
FIG. 5B is a sectional view taken along a line A—A of FIG. 5A.
Figure 5C:
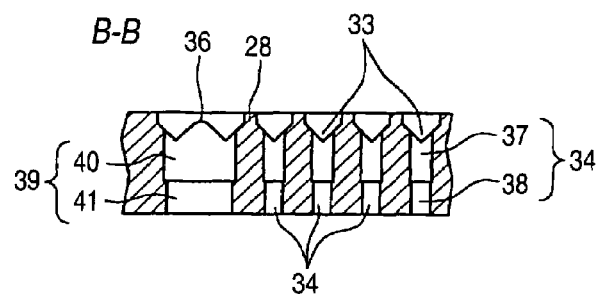
FIG. 5C is a sectional view taken along a line B—B of FIG. 5A.

The elongated recess portion 33 is a recess portion in a groove-like shape constituting a pressure generating chamber 29 and is constituted by a groove in a linear shape as shown to enlarge in FIG. 5A. According to the embodiment, 180 pieces of grooves each having a width of about 0.1 mm, a length of about 1.5 mm and a depth of about 0.1 mm are aligned side by side. A bottom face of the elongated recess portion 33 is recessed in a V-like shape by reducing a width thereof as progressing in a depth direction (that is, depth side). The bottom face is recessed in the V-like shape to increase a rigidity of a partition wall 28 for partitioning the contiguous pressure generating chambers 29. That is, by recessing the bottom face in the V-like shape, a wall thickness of the proximal portion of the partition wall 28 is thickened to increase the rigidity of the partition wall 28. Further, when the rigidity of the partition wall 28 is increased, influence of pressure variation from the contiguous pressure generating chamber 29 is difficult to be effected. That is, a variation of ink pressure from the contiguous pressure generating chamber 29 is difficult to transmit. Further, by recessing the bottom face in the V-like shape, the elongated recess portion 33 can be formed with excellent dimensional accuracy by plastic working (to be mentioned later). Further, an angle between the inner faces of the recess portion 33 is, for example, around 90 degrees although prescribed by a working condition.

Further, since a wall thickness of a distal end portion of the partitioning wall 28 is extremely thin, even when the respective pressure generating chambers 29 are densely formed, a necessary volume can be ensured.

Both longitudinal end portions of the elongated recess portion 33 are sloped downwardly to inner sides as progressing to the depth side. The both end portions are constituted in this way to form the elongated recess portion 33 with excellent dimensional accuracy by plastic working.

Further, contiguous to the elongated recess portion 33 at the both ends of the row, there are formed single ones of dummy recesses 36 having a width wider than that of the elongated recess portion 33. The dummy recess portion 36 is a recess portion in a groove-like shape constituting a dummy pressure generating chamber which is not related to ejection of ink drops. The dummy recess portion 36 according to the embodiment is constituted by a groove having a width of about 0.2 mm, a length of about 1.5 mm and a depth of about 0.1 mm. Further, a bottom face of the dummy recess portion 36 is recessed in a W-like shape. This is also for increasing the rigidity of the partition wall 28 and forming the dummy recess portion 36 with excellent dimensional accuracy by plastic working.

Further, a row of recesses is constituted by the respective elongated recess portions 33 and the pair of dummy recess portions 36. According to the embodiment, two rows of the recesses are formed as shown in FIG. 4.

The communicating port 34 is formed as a small through hole penetrating from one end of the elongated recess portion 33 in a plate thickness direction. The communicating ports 34 are formed for respective ones of the elongated recess portions 33 and are formed by 180 pieces in a single recess portion row. The communicating port 34 of the embodiment is in a rectangular shape in an opening shape thereof and is constituted by a first communicating port 37 formed from a side of the elongated recess portion 33 to a middle in the plate thickness direction in the chamber formation plate 30 and a second communicating port 38 formed from a surface thereof on a side opposed to the elongated recess portion 33 up to a middle in the plate thickness direction.

Further, sectional areas of the first communicating port 37 and the second communicating port 38 differ from each other and an inner dimension of the second communicating port 38 is set to be slightly smaller than an inner dimension of the first communicating port 37. This is caused by manufacturing the communicating port 34 by pressing. The chamber formation plate 30 is fabricated by working a nickel plate having a thickness of 0.35 mm, a length of the communicating port 34 becomes equal to or larger than 0.25 mm even when the depth of the recess portion 33 is subtracted. Further, the width of the communicating port 34 needs to be narrower than the groove width of the elongated recess portion 33, set to be less than 0.1 mm. Therefore, when the communicating port 34 is going to be punched through by a single time of working, a male die (punch) is buckled due to an aspect ratio thereof.

Therefore, in the embodiment, the working is divided into two steps. In the first step, the first communicating port 37 is formed halfway in the plate thickness direction, and in the second step, the second communicating port 38 is formed. The working process of this communicating port 34 will be described later.

Further, the dummy recess portion 36 is formed with a dummy communicating port 39. Similar to the above-described communicating port 34, the dummy communicating port 39 is constituted by a first dummy communicating port 40 and a second dummy communicating port 41 and an inner dimension of the second dummy communicating port 41 is set to be smaller than an inner dimension of the first dummy communicating port 40.

Further, although according to the embodiment, the communicating port 34 and the dummy communicating port 39 opening shapes of which are constituted by small through holes in a rectangular shape are exemplified, the invention is not limited to the shape. For example, the shape may be constituted by a through hole opened in a circular shape or a through hole opened in a polygonal shape.

The escaping recess portion 35 forms an operating space of a compliance portion 46 (described later) in the common ink reservoir 14. According to the embodiment, the escaping recess portion 35 is constituted by a recess portion in a trapezoidal shape having a shape substantially the same as that of the recess 15 of the casing 2 and a depth equal to that of the elongated recess portion 33.

Next, the above-described elastic plate 32 will be explained. The elastic plate 32 is a kind of a sealing plate of the invention and is fabricated by, for example, a composite material having a two-layer structure laminating an elastic film 43 on a support plate 42. According to the embodiment, a stainless steel plate is used as the support plate 42 and PPS (polyphenylene sulphide) is used as the elastic film 43.

Figure 6:
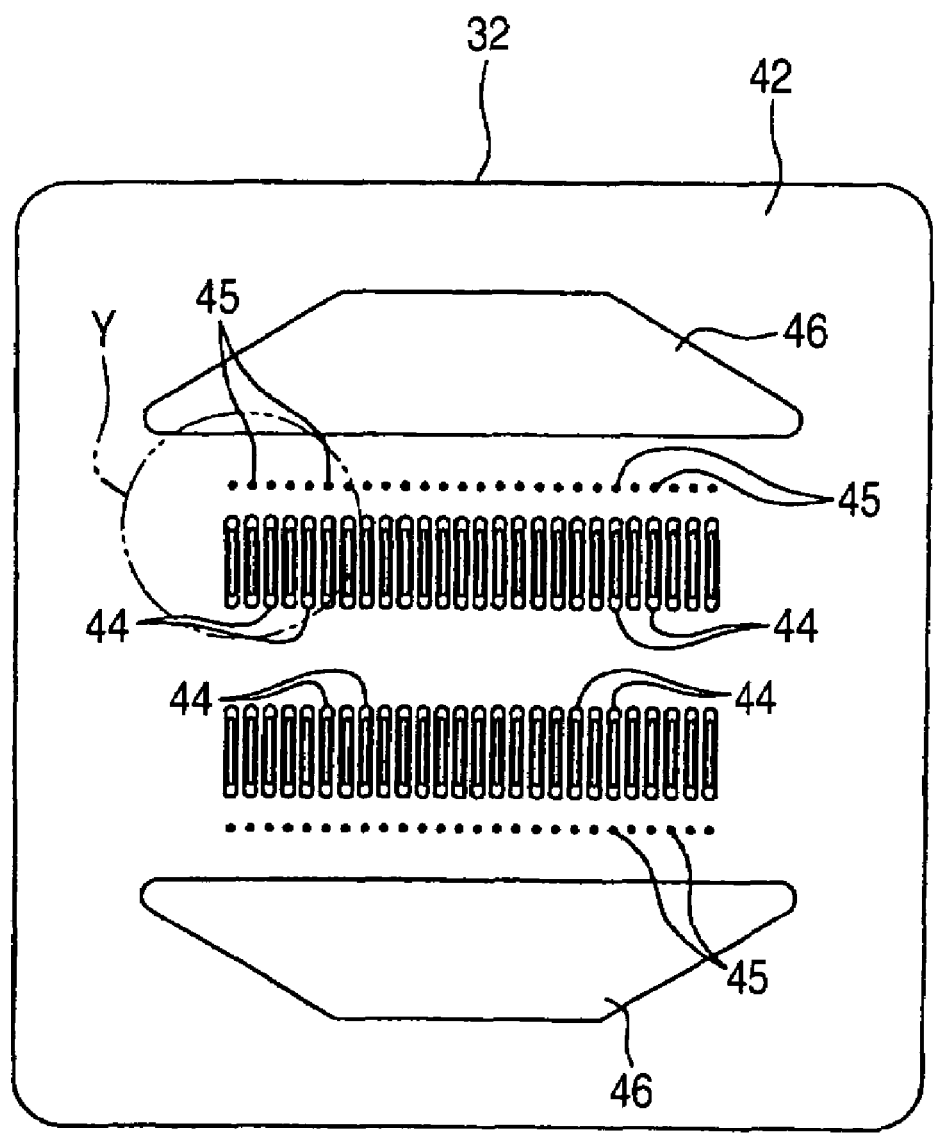
FIG. 6 is a plan view of an elastic plate.

As shown in FIG. 6, the elastic plate 32 is formed with a diaphragm portion 44, an ink supply port 45 and the compliance portion 46.

The diaphragm portion 44 is a portion for partitioning a portion of the pressure generating chamber 29. That is, the diaphragm portion 44 seals an opening face of the elongated recess portion 33 and forms to partition the pressure generating chamber 29 along with the elongated recess portion 33. As shown in FIG. 7A, the diaphragm portion 44 is of a slender shape in correspondence with the elongated recess portion 33 and is formed for each of the elongated recess portions 33 with respect to a sealing region for sealing the elongated recess portion 33. Specifically, a width of the diaphragm portion 44 is set to be substantially equal to the groove width of the elongated recess portion 33 and a length of the diaphragm portion 44 is set to be a slight shorter than the length of the elongated recess portion 33. With regard to the length, the length is set to be about two thirds of the length of the elongated recess portion 33. Further, with regard to a position of forming the diaphragm portion 44, as shown in FIG. 2, one end of the diaphragm portion 44 is aligned to one end of the elongated recess portion 33 (end portion on a side of the communicating port 34).

Figure 7B:
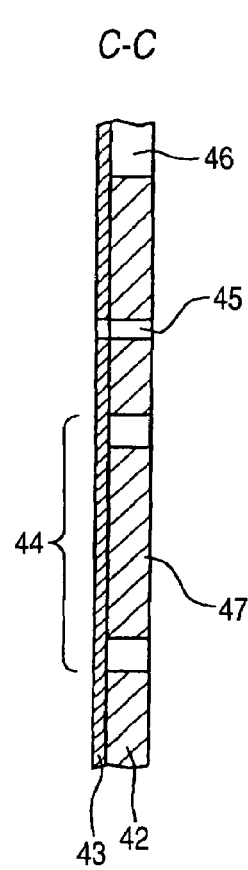
FIG. 7B is a sectional view taken along a line C—C of FIG. 7A.
Figure 7A:
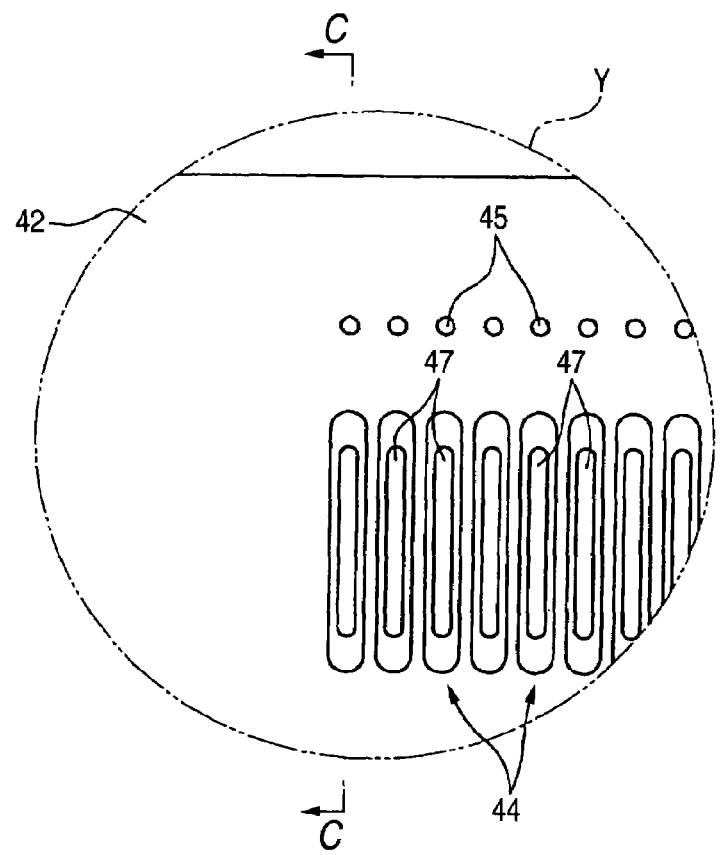
FIG. 7A is a view enlarging a Y portion of FIG. 6.

As shown in FIG. 7B, the diaphragm portion 44 is fabricated by removing the support plate 42 at a portion thereof in correspondence with the elongated recess portion 33 by etching or the like to constitute only the elastic film 43 and an island portion 47 is formed at inside of the ring. The island portion 47 is a portion bonded with a distal end face of the piezoelectric vibrator 10.

The ink supply port 45 is a hole for communicating the pressure generating chamber 29 and the common ink reservoir 14 and is penetrated in a plate thickness direction of the elastic plate 32. Similar to the diaphragm portion 44, also the ink supply port 45 is formed to each of the elongated recess portions 33 at a position in correspondence with the elongated recess portion 33. As shown in FIG. 2, the ink supply port 45 is bored at a position in correspondence with other end of the elongated recess portion 33 on a side opposed to the communicating port 34. Further, a diameter of the ink supply port 45 is set to be sufficiently smaller than the groove width of the elongated recess portion 33. According to the embodiment, the ink supply port 45 is constituted by a small through hole of 23 μm.

Reason of constituting the ink supply port 45 by the small through hole in this way is that flow path resistance is provided between the pressure generating chamber 29 and the common ink reservoir 14. That is, according to the recording head 1, an ink drop is ejected by utilizing a pressure variation applied to ink at inside of the pressure generating chamber 29. Therefore, in order to efficiently eject an ink drop, it is important that ink pressure at inside of the pressure generating chamber 29 is prevented from being escaped to a side of the common ink reservoir 14 as less as possible. From the view point the ink supply port 45 is constituted by the small through hole.

Further, when the ink supply port 45 is constituted by the through hole as in the embodiment, there is an advantage that the working is facilitated and high dimensional accuracy is achieved. That is, the ink supply port 45 is the through hole, can be fabricated by laser machining. Therefore, even a small diameter can be fabricated with high dimensional accuracy and also the operation is facilitated.

The compliance portion 46 is a portion for partitioning a portion of the common ink reservoir 14. That is, the common ink reservoir 14 is formed to partition by the compliance portion 46 and the recess 15. The compliance portion 46 is of a trapezoidal shape substantially the same as an opening shape of the recess 15 and is fabricated by removing a portion of the support plate 42 by etching or the like to constitute only the elastic film 43.

Further, the support plate 42 and the elastic film 43 constituting the elastic plate 32 are not limited to the example. Further, polyimide may be used as the elastic film 43. Further, the elastic plate 32 may be constituted by a metal plate provided with a thick wall and a thin wall at a surrounding of the thick wall for constituting the diaphragm portion 44 and a thin wall for constituting the compliance portion 46.

Next, the above-described nozzle plate 31 will be explained. The nozzle plate 31 is a plate-like member made of a metal aligned with a plurality of nozzle orifices 48 at a pitch in correspondence with a dot forming density. According to the embodiment, a nozzle row is constituted by aligning a total of 180 pieces of the nozzle orifices 48 and two rows of the nozzles are formed as shown in FIG. 2.

Further, when the nozzle plate 31 is bonded to other face of the chamber formation plate 30, that is, to a surface thereof on a side opposed to the elastic plate 32, the respective nozzle orifices 48 face the corresponding communicating ports 34.

Further, when the above-described elastic plate 31 is bonded to one surface of the chamber formation plate 30, that is, a face thereof for forming the elongated recess portion 33, the diaphragm portion 44 seals the opening face of the elongated recess portion 33 to form to partition the pressure generating chamber 29. Similarly, also the opening face of the dummy recess portion 36 is sealed to form to partition the dummy pressure generating chamber. Further, when the above-described nozzle plate 31 is bonded to other surface of the chamber formation plate 30, the nozzle orifice 48 faces the corresponding communicating port 34. When the piezoelectric vibrator 10 bonded to the island portion 47 is extended or contracted under the state, the elastic film 43 at a surrounding of the island portion is deformed and the island portion 47 is pushed to the side of the elongated recess portion 33 or pulled in a direction of separating from the side of the elongated recess portion 33. By deforming the elastic film 43, the pressure generating chamber 29 is expanded or contracted to provide a pressure variation to ink at inside of the pressure generating chamber 29.

When the elastic plate 32 (that is, the flow path unit 4) is bonded to the casing 2, the compliance portion 46 seals the recess 15. The compliance portion 46 absorbs the pressure variation of ink stored in the common ink reservoir 14. That is, the elastic film 43 is deformed in accordance with pressure of stored ink. Further, the above-described escaping recess portion 35 forms a space for allowing the elastic film 43 to be expanded.

In a case where the compliance portion 46 is omitted while reducing the volume of the common ink reservoir 14, the escaping recess portion 35 may serve as a part of the common ink reservoir. Further, the escaping recess portion 35 may be formed as a through hole so that the obtained space is used as a part of the common ink reservoir.

The recording head 1 having the above-described constitution includes a common ink flow path from the ink supply needle 19 to the common ink reservoir 14, and an individual ink flow path reaching each of the nozzle orifices 48 by passing the pressure generating chamber 29 from the common ink reservoir 14. Further, ink stored in the ink cartridge is introduced from the ink supply needle 19 and stored in the common ink reservoir 14 by passing the common ink flow path. Ink stored in the common ink reservoir 14 is ejected from the nozzle orifice 48 by passing the individual ink flow path.

For example, when the piezoelectric vibrator 10 is contracted, the diaphragm portion 44 is pulled to the side of the vibrator unit 3 to expand the pressure generating chamber 29. By the expansion, inside of the pressure generating chamber 29 is brought under negative pressure, ink at inside of the common ink reservoir 14 flows into each pressure generating chamber 29 by passing the ink supply port 45. Thereafter, when the piezoelectric vibrator 10 is extended, the diaphragm portion 44 is pushed to the side of the chamber formation plate 30 to contract the pressure generating chamber 29. By the contraction, ink pressure at inside of the pressure generating chamber 29 rises and an ink drop is ejected from the corresponding nozzle orifice 48.

According to the recording head 1, the bottom face of the pressure generating chamber 29 (elongated recess portion 33) is recessed in the V-like shape. Therefore, the wall thickness of the proximal portion of the partition wall 28 for partitioning the contiguous pressure generating chambers 29 is formed to be thicker than the wall thickness of the distal end portion. Thereby, the rigidity of the thick wall 26 can be increased. Therefore, in ejecting an ink drop, even when a variation of ink pressure is produced at inside of the pressure generating chamber 29, the pressure variation can be made to be difficult to transmit to the contiguous pressure generating chamber 29. As a result, the so-called contiguous cross talk can be prevented and ejection of ink drop can be stabilized.

According to the embodiment, the ink supply port 45 for communicating the common ink reservoir 14 and the pressure generating chamber 29 is constituted by the small hole penetrating the elastic plate 32 in the plate thickness direction, high dimensional accuracy thereof is easily achieved by laser machining or the like. Thereby, an ink flowing characteristic into the respective pressure generating chambers 29 (flowing velocity, flowing amount or the like) can be highly equalized. Further, when the fabrication is carried out by the laser beam, the fabrication is also facilitated.

According to the embodiment, there are provided the dummy pressure generating chambers which are not related to ejection of ink drop contiguously to the pressure generating chambers 29 at end portions of the row (that is, a hollow portion partitioned by the dummy recess portion 36 and the elastic plate 32), with regard to the pressure generating chambers 29 at both ends, one side thereof is formed with the contiguous pressure generating chamber 29 and an opposed thereof is formed with the dummy pressure generating chamber. Thereby, with regard to the pressure generating chambers 29 at end portions of the row, the rigidity of the partition wall partitioning the pressure generating chamber 29 can be made to be equal to the rigidity of the partition wall at the other pressure generating chambers 29 at a middle of the row. As a result, ink drop ejection characteristics of all the pressure generating chambers 29 of the one row can be made to be equal to each other.

With regard to the dummy pressure generating chamber, the width on the side of the aligning direction is made to be wider than the width of the respective pressure generating chambers 29. In other words, the width of the dummy recess portion 36 is made to be wider than the width of the elongated recess portion 33. Thereby, ejection characteristics of the pressure generating chamber 29 at the end portion of the row and the pressure generating chamber 29 at the middle of the row can be made to be equal to each other with high accuracy.

According to the embodiment, the recess 15 is formed by partially recessing the front end face of the casing 2, the common ink reservoir 14 is formed to partition by the recess 15 and the elastic plate 32, an exclusive member for forming the common ink reservoir 14 is dispensed with and simplification of the constitution is achieved. Further, the casing 2 is fabricated by resin dieing, fabrication of the recess 15 is also relatively facilitated.

Next, a method of manufacturing the recording head 1 will be explained. Since the manufacturing method is characterized in steps of manufacturing the chamber formation plate 30, an explanation will be mainly given for the steps of manufacturing the chamber formation plate 30.

The chamber formation plate 30 is fabricated by forging by a progressive die. Further, a metal strip 55 (referred to as "strip 55" in the following explanation) used as a material of the chamber formation plate 30 is made of nickel as described above, The steps of manufacturing the chamber formation plate 30 comprises steps of forming the elongated recess portion 33 and steps of forming the communicating port 34 which are carried out by a progressive die.

Figure 8A:
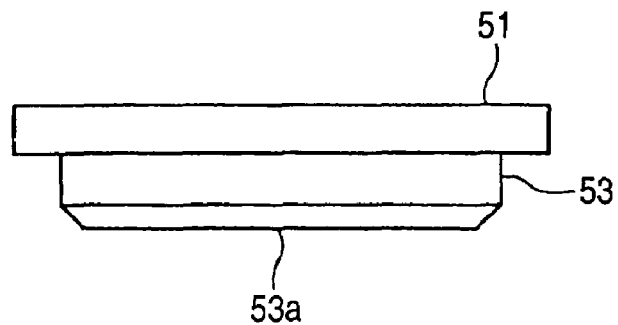
FIGS. 8A and 8B are views for explaining a male die used in forming an elongated recess portion.
Figure 8B:
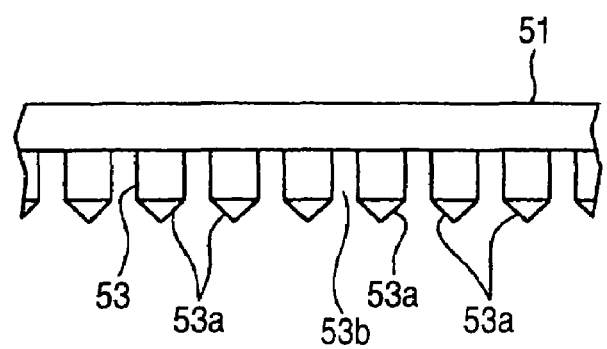
Figure 9A:
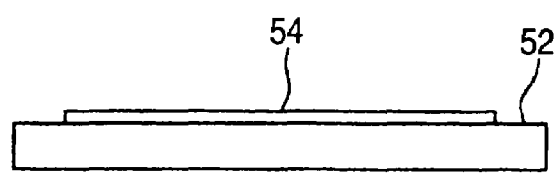
FIGS. 9A and 9B are views for explaining a femal die used in forming the elongated recess portion.
Figure 9B:
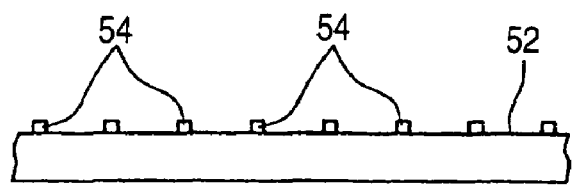

In the elongated recess portion forming steps, a male die 51 shown in FIGS. 8A and 8B and a female die shown in FIGS. 9A and 9B are used. The male die 51 is a die for forming the elongated recess portion 33. The male die is aligned with projections 53 for forming the elongated recess portions 33 by a number the same as that of the elongated recess portions 33. Further, the projections 53 at both ends in an aligned direction are also provided with dummy projections (not illustrated) for forming the dummy recess portions 36. A distal end portion 53a of the projection 53 is tapered from a center thereof in a width direction by an angle of about 45 degrees as shown in FIG. 8B. Thereby, the distal end portion 53a is sharpened in the V-like shape in view from a longitudinal direction thereof. Further, both longitudinal ends of the distal end portions 53A are tapered by an angle of about 45 degrees as shown in FIG. 8A. Therefore, the distal end portion 53a of the projection 53 is formed in a shape of tapering both ends of a triangular prism.

Further, the female die 52 is formed with a plurality of projections 54 at an upper face thereof. The projection 54 is for assisting to form the partition wall partitioning the contiguous pressure generating chambers 29 and is disposed between the elongated recess portions 33. The projection 54 is of a quadrangular prism, a width thereof is set to be a slight narrower than an interval between the contiguous pressure generating chambers 29 (thickness of partition wall) and a height thereof is set to a degree the same as that of the width. A length of the projection 54 is set to a degree the same as that of a length of the elongated recess portion 33 (projection 53).

Figure 10A:
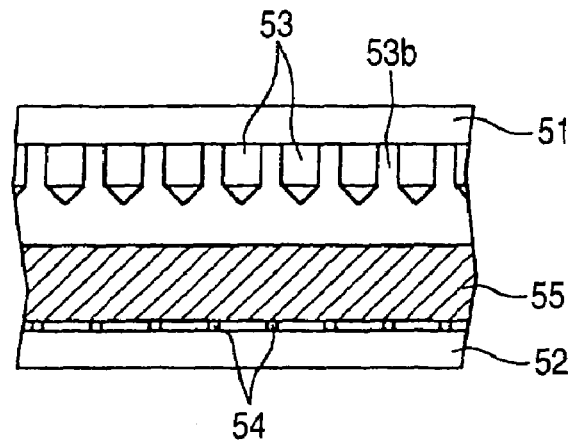
FIGS. 10A to 10C are views for explaining a step of forming the elongated recess portion.
Figure 10B:
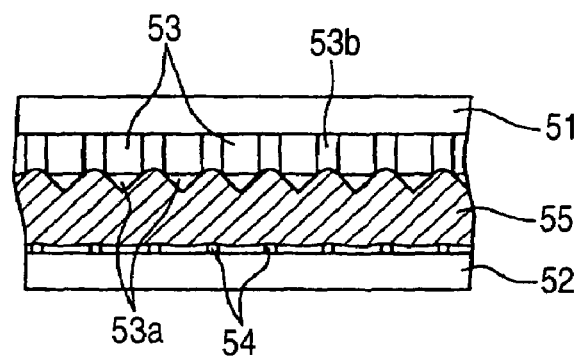
Figure 10C:
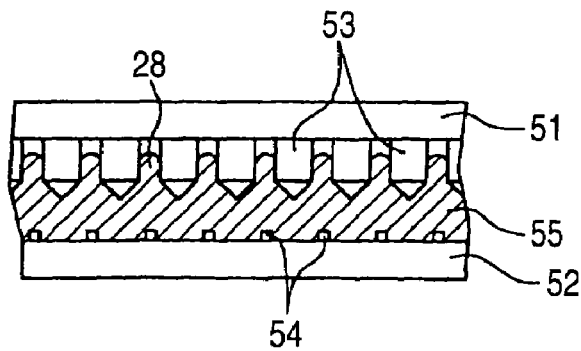

In the elongated recess portion forming steps, first, as shown in FIG. 10A, the strip 55 is mounted at an upper face of the female die 52 and the male die 51 is arranged on an upper side of the strip 55. Next, as shown in FIG. 10B, the male die 51 is moved down to push the distal end portion of the projection 53 into the strip 55. At this occasion, since the distal end portion 53a of the projection 53 is sharpened in the V-like shape, the distal end portion 53a can firmly be pushed into the strip 55 without buckling. Pushing of the projection 53 is carried out up to a middle in a plate thickness direction of the strip 55 as shown in FIG. 10C.

By pushing the projection 53, a portion of the strip 55 flows to form the elongated recess portion 33. In this case, since the distal end portion 53a of the projection 53 is sharpened in the V-like shape, even the elongated recess portion 33 having a small shape can be formed with high dimensional accuracy. That is, the portion of the strip 55 pushed by the distal end portion 53a flows smoothly, the elongated recess portion 33 to be formed is formed in a shape following the shape of the projection 53. Further, since the both longitudinal ends of the distal end portion 53a are tapered, the strip 55 pushed by the portions also flows smoothly. Therefore, also the both end portions in the longitudinal direction of the elongated recess portion 33 are formed with high dimensional accuracy.

Since pushing of the projection 53 is stopped at the middle of the plate thickness direction, the strip 55 thicker than in the case of forming a through hole can be used. Thereby, the rigidity of the chamber formation plate 30 can be increased and improvement of an ink ejection characteristic is achieved. Further, the chamber formation plate 30 is easily dealt with and the operation is advantageous also in enhancing plane accuracy.

A portion of the strip 55 is raised into a space between the contiguous projections 53 by being pressed by the projections 53. In this case, the projection 54 provided at the female die 52 is arranged at a position in correspondence with an interval between the projections 53, flow of the strip 55 into the space is assisted. Thereby, the strip 55 can efficiently be introduced into the space between the projections 53 and the protrusion (i.e., the partition wall 28) can be formed highly.

Plastic working is performed on the strip (material) 55 by the male die 51 and the female die 52 under condition of room temperature, and plastic working described below is performed similarly under condition of room temperature.

The elongated recess portion 33 is formed basically as described above. Precision in the formation of the elongated recess portion 33, particularly, how to mold the partition wall 28 is important. In order to moot such needs, in the invention, a forging punch is caused to comprise a first die and a second die including a preforming die and a finishing die, and a special shape is given to the second die to form the proper partition wall 28.

Figure 11:
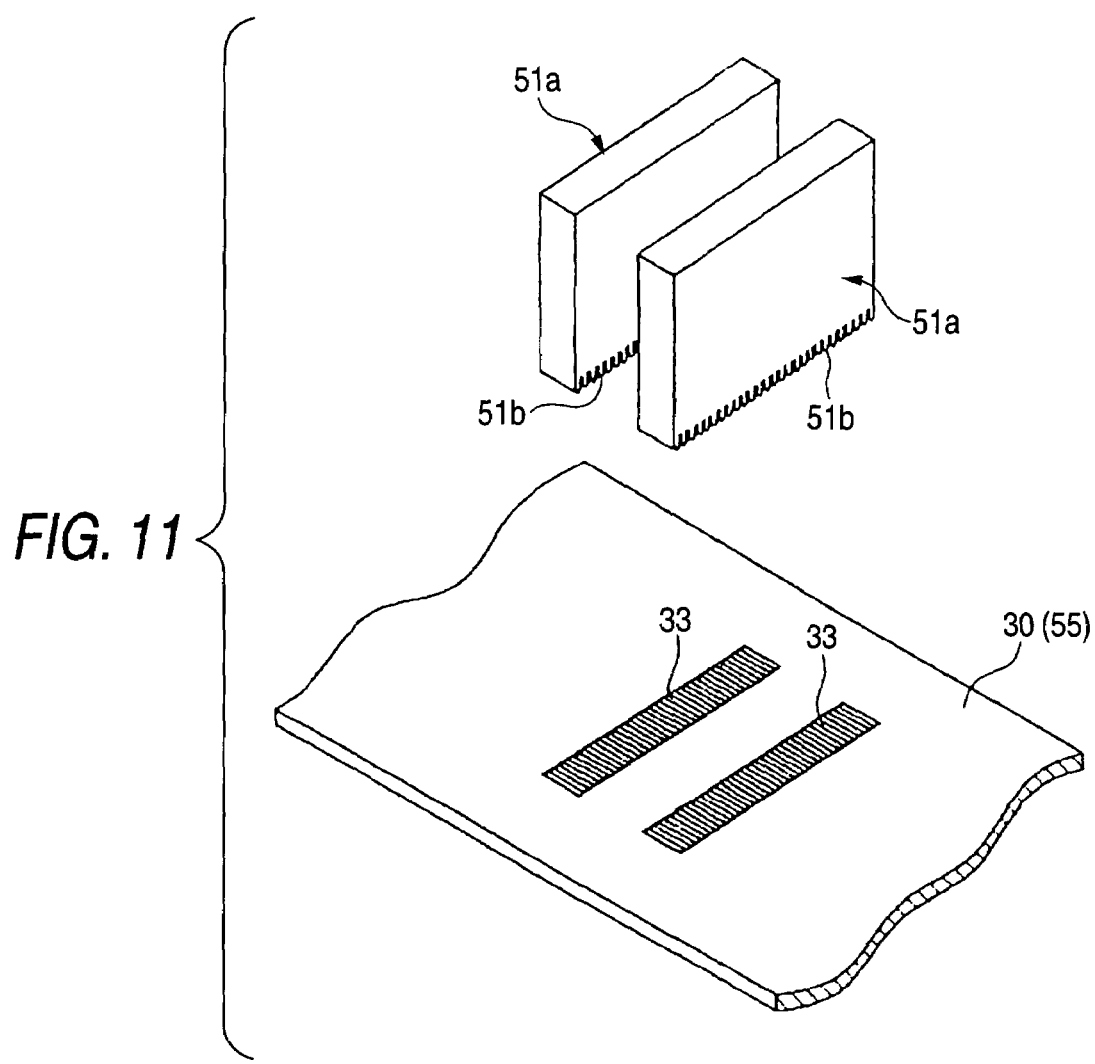
FIG. 11 is a perspective view showing a relationship between the male die and a material to be processed.

As shown in FIG. 11, large number of molding punches 51b are arranged in the male die 51a, that is, the first die. In order to form the elongated recess portions 33, the molding punches 51b are elongated to form projections 53c. The projections 5 are arranged in parallel at a predetermined pitch. In order to form the partition walls 28, gaps 53b (see FIG. 12B) are provided between the molding punches 51b. A state in which the first die 51a is pushed into the chamber formation plate 30 (strip 55) to be a worked object is shown in FIG. 12C.

In this embodiment, the material (strip) 55 is caused to flow into the gaps 53b by the preforming die 56 and the distribution of the material 55 in the gaps 53b is caused to approach a normal state as much as possible by the finishing die 57. Consequently, the amount of the flow of the material into the gaps 53b is brought into an almost straight state in the longitudinal direction of the gaps 53b, which is convenient for the case in which that portions are caused to serve as a member such as the partition wall 28 of the pressure generating chambers 29 of the liquid ejection head 1.

The structure and operation of the second die 52a will be described in detail as follows.

Figure 12A:
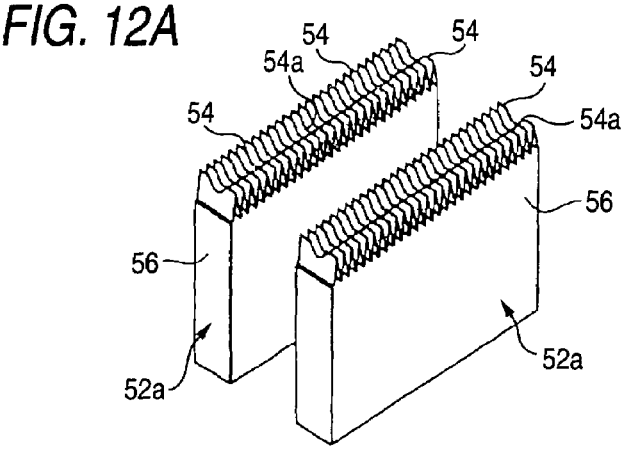
FIG. 12A is a perspective view of a preforming female die according to one embodiment of the invention.

As shown in FIG. 12A, in a female die 52a, that is, the second die, each of projections 54 is formed with a concave portion 54a at a portion corresponding to the longitudinal middle part of the projection 53c. The preforming die 56 is provided with the projections 54 opposed to the gaps 53b and having almost the same length as the length of the gaps 53b.

Figure 14A:
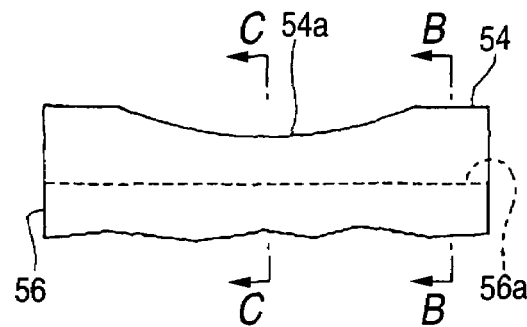
FIG. 14A is an enlarged view of one projection in the preforming female die.
Figure 14B:
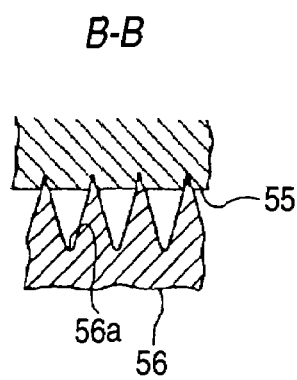
FIG. 14B is a section view taken along a line B—B in FIG. 14A.
Figure 14C:
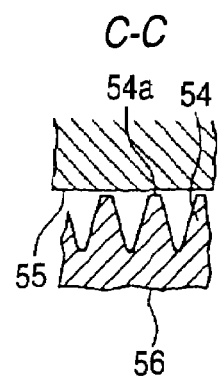
FIG. 14C is a section view taken along a line C—C in FIG. 14A.

FIG. 14A enlargedly shows the concave portion 54a. FIG. 14B shows a cross section of a part of the projection 54 other than the concave portion 54a. FIG. 14C shows a cross section of a part of the projection 54 where the concave portion 54a is formed.

Figure 12B:
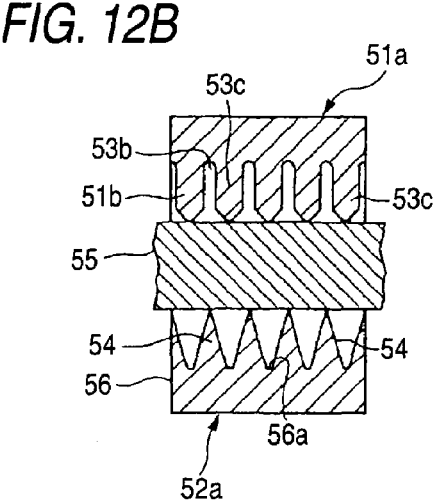
FIGS. 12B and 12C are sectional views showing a primary molding.
Figure 12C:
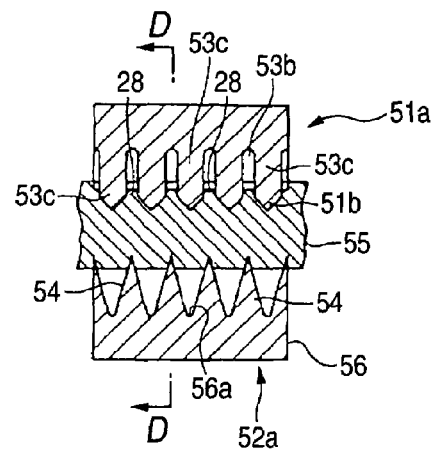
Figure 12C:
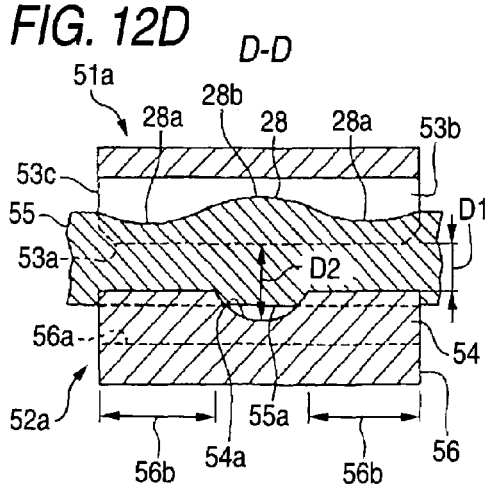

The projection 54 conceptually shown in FIGS. 9A through 10C is a convex member having a small height. In order to form the concave portion 54a, a certain height is actually required for the projection 54. In order to obtain such a certain height, each of the projections 54 has a wedge-shaped cross section as shown in FIG. 12B. The angle of the wedge-shaped portion is set to be an angle of 90 degrees or less. Valley portions 56a are defined between the adjacent projections 54.

Figure 12E:
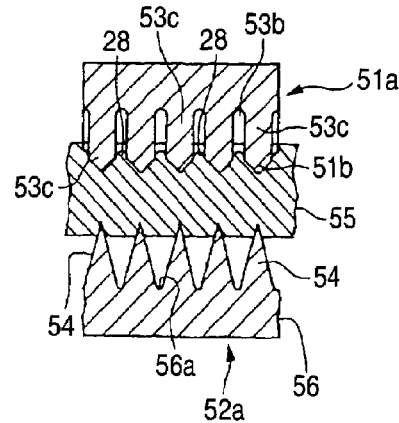
FIG. 12E is a modified example of a position of the preforming female die.

As shown in FIGS. 12B and 12C, the material 55 opposed to the gaps 53b is pressed by the projections 54 plastically flows toward the gaps 53b directly. Incidentally, the projections 54 may be laterally shifted by a half-pitch so that the projections 54 are disposed in opposition to the projections 53c, respectively, as shown in FIG. 12E. In this case, an amount of material deformation to be compressed between the projections 54 and the projections 53c becomes largest. Accordingly, the parts of the material 55 respectively located between the opposed tip edges of the projections 53c and 54 flow obliquely upward of the projections 54 shown in FIG. 12E, and is pressed into the gaps 53b. Thus, the material flows into each gap 53b from both sides thereof so that sufficient molding accuracy can be attained.

The length of the concave portion 54a of the projection 54 in the longitudinal direction is set to be approximately ⅔ of the length of the projection 54 or less. Preferably, it is ½ of the length of the projection 54 or less. The pitch of the projection 54 is set to be 0.14 mm. The pitch of the projection 54 is set to be 0.3 mm or less so that more suitable preforming is carried out in a forging work of a component such as the liquid ejection head. The pitch is preferably 0.2 mm or less and more preferably 0.15 mm or less. Furthermore, at least the concave portion 54a of the projection 54 has a surface thereof finished smoothly. For the finishing, mirror finishing is suitable, and furthermore, chromium plating may be carried out.

Figure 15:
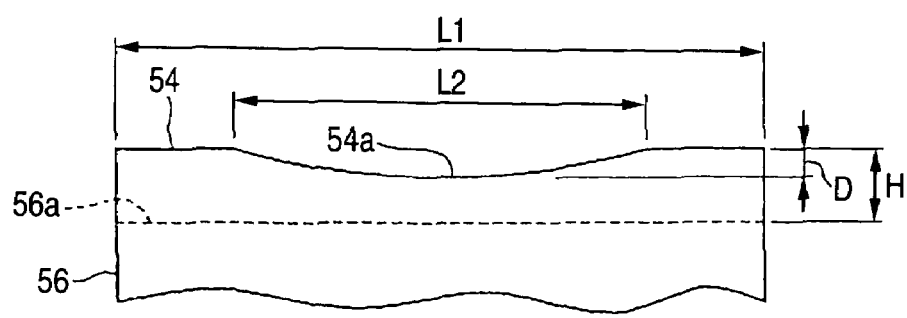
FIG. 15 is an enlarged view for explaining dimensions of essential parts of the projection in the preforming female die.

As shown in FIG. 15, a ratio of a length L2 of the concave portion 54a to a length L1 of the projections 54, i.e., L2/L1, is selected to be ⅔ or less, preferably ½ or less. H denotes a length from the bottom part 56a to the tip of the projections 54, viz., a height of the projection 54. D denotes a depth of the concave portion 54a. To secure good plastic flow of the material at the gaps 53b, predetermined dimensional ratios are set up among those parts.

Specifically, a ratio of the depth D of the concave portion 54a to the length L2 of the concave portion 54a is about 0.05 to 0.3. In this instance, an actual length L2 is within 0.5 mm to 1 mm, and the depth D is within 0.05 mm to 0.15 mm. A ratio of the depth D of the concave portion 54a to the height H of the projections 54 is within about 0.5 to 1. In this instance, an actual height H is within 0.5 mm to 1.5 mm. The length L1 of the projections 54 is 1.6 mm in this instance, and accordingly, L2/L1 is within 0.31 to 0.62.

Figure 16A:
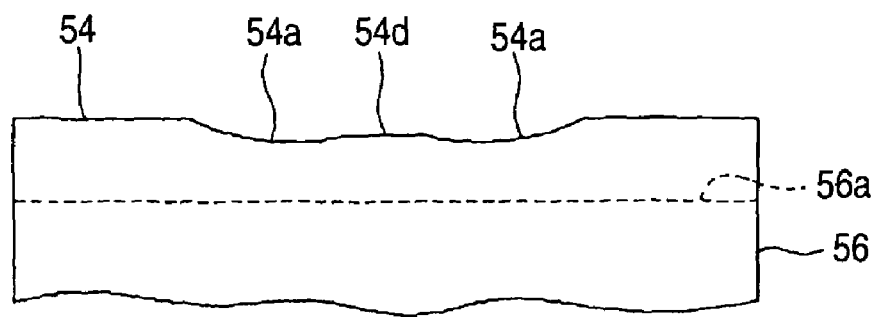
FIG. 16A is an enlarged view of a first modified example of the preforming female die.

FIG. 16A is a first modified example of the preforming die 56. In this case, a reinforcing convex portion 54d is provided at a mid part of the concave portion 54a. At the time of pressure forming operation, a force to expand the concave portion 54a acts on the preforming die 56. A stress concentrates on the deepest part of the concave portion 54a so that the deepest part is likely to crack. With provision of the reinforcing convex portion 54d, however, no stress concentrates on the deepest part of the concave portion, and hence, there is no ones that the deepest part cracks.

Figure 16B:
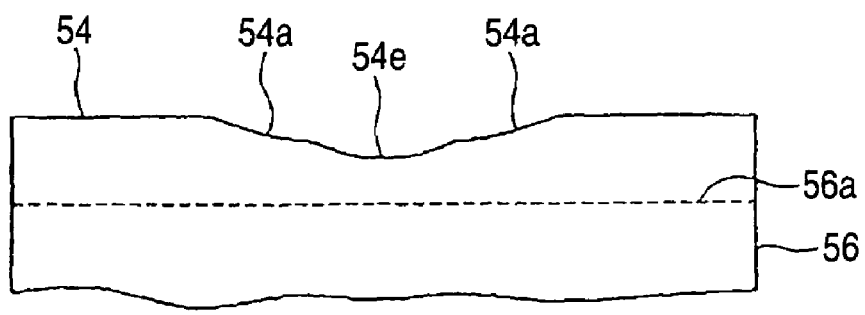
FIG. 16B is an enlarged view of a second modified example of the preforming female die.

FIG. 16B shows a second modified example of the preforming die 56. In this case, a relief recess 54e is provided at a mid part of the concave portion 54a. The material 55 flowing into the concave portion 54a presses the deepest part of the concave portion 54a so that the deepest part is likely to crack. With provision of the relief recess 54e, however, no pressure application to the deepest part of the concave portion occurs. There is no anxiety that the deepest part cracks.

Figure 17A:
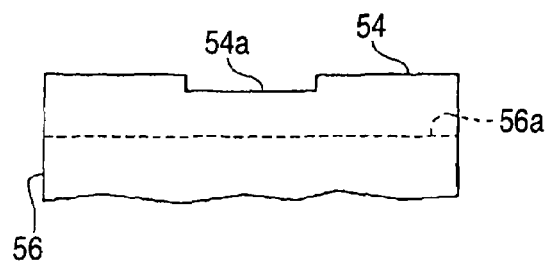
FIG. 17A is an enlarged view of a third modified example of the preforming female die.
Figure 17B:
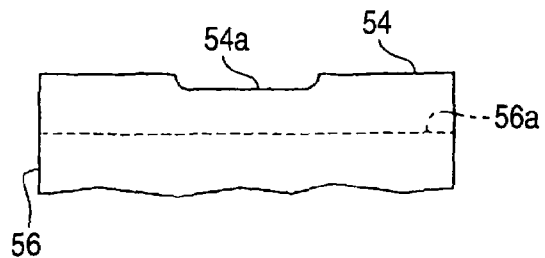
FIG. 17B is an enlarged view of a fourth modified example of the preforming female die.
Figure 17C:
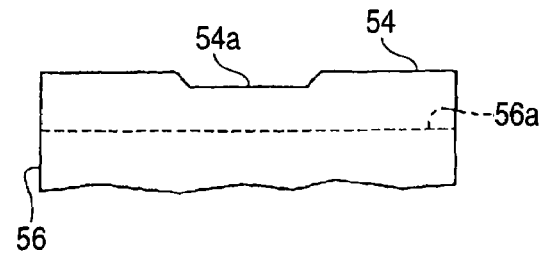
FIG. 17C is an enlarged view of a fifth modified example of the preforming female die.
Figure 17D:
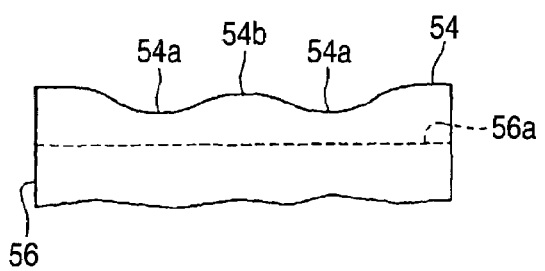
FIG. 17D is an enlarged view of a sixth modified example of the preforming female die.
Figure 17E:
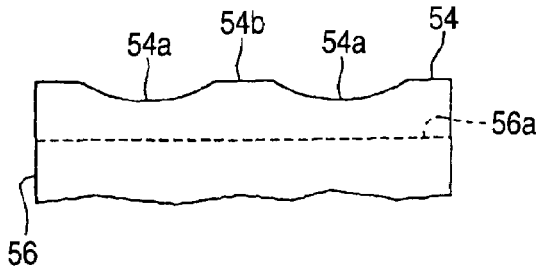
FIG. 17E is an enlarged view of a seventh modified example of the preforming female die.

FIG. 17A shows a third modified example of the preforming die 56 in which the convex portion 54a is formed with flat faces. FIG. 17B shows a fourth modified example of the preforming die 56 in which only bottom corners of the convex portion 54a are curved. FIG. 17C shows a fifth modified example of the preforming die 56 in which the convex portion 54a is formed with sloped flat side faces and a flat bottom face. FIG. 17D shows a sixth modified example of the preforming die 56 in which the convex portion 54b substantially defines two concave portions 54b at both sides thereof. FIG. 17E shows a seventh example of the preforming die 56 in which a top of the convex portion 54b shown in FIG. 17D is made flat.

Figure 17F:
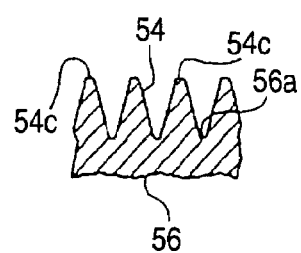
FIG. 17F is an enlarged view of an eighth modified example of the preforming female die.

While the projection 54 is wedge-shaped and has a sharp tip portion, a flat top surface 54c or a rounded tip portion may be formed as shown in FIG. 17F depending on the moving condition of the material 55.

Figure 13A:
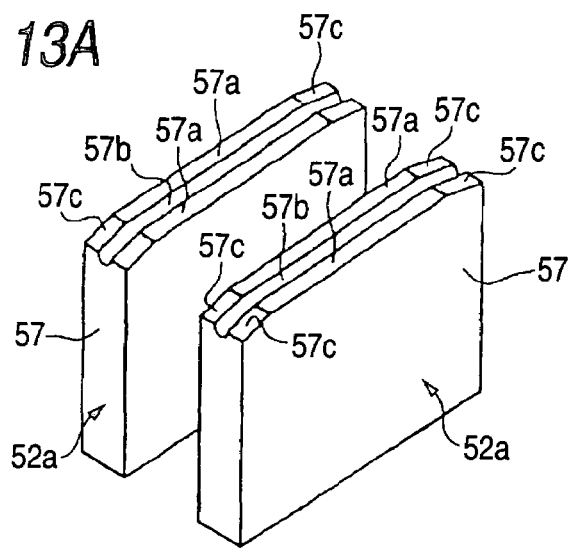
FIG. 13A is a perspective view of a finishing female die according to one embodiment of the invention.

The finishing die 57 is used after the primary molding using the preforming die 56. As shown in FIG. 13A, the finishing die 57 is formed with flat surfaces 57a located both sides of a concave portion 57b. The flat surfaces 57a and the concave portion 57b are extended entirely in the longitudinal direction of the finishing die 57. The concave portion 57b is located at a part corresponding to the concave portions 54a of the projections 54 in the preforming die 56.

Slope faces 57c are provided both longitudinal ends of each flat surface 57a such that portions closer to the ends are lowered.

Figure 18A:
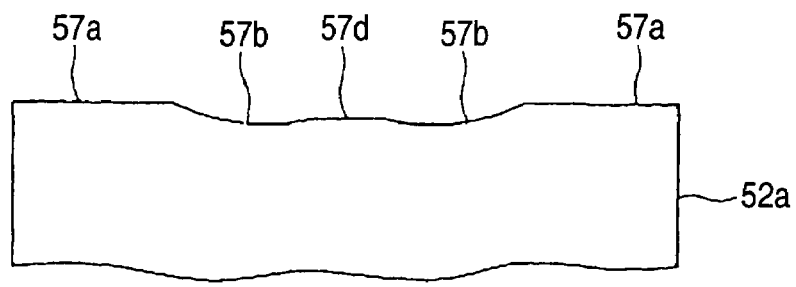
FIG. 18A is an enlarged view of a first modified example of the finishing female die.

FIG. 18A is a first modified example of the finishing die 57. In this case, a reinforcing convex portion 57d is provided at a mid part of the concave portion 57b. At the time of pressure forming operation, a force to expand the concave portion 57b acts on the finishing die 57. A stress concentrates on the deepest part of the concave portion 57b so that the deepest part is likely to crack. With provision of the reinforcing convex portion 57d, however, no stress concentrates on the deepest part of the concave portion, and hence, there is no chance that the deepest part cracks.

Figure 18B:
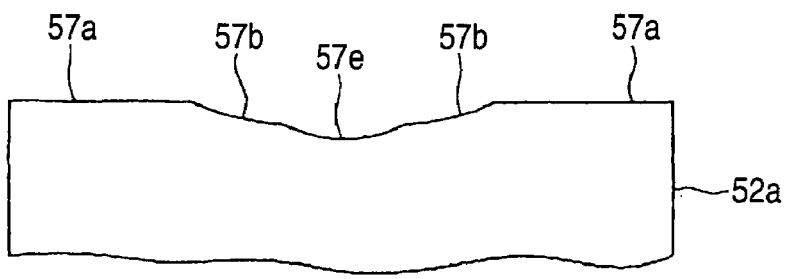
FIG. 18B is an enlarged view of a second modified example of the finishing female die.

FIG. 18B shows a second modified example of the finishing die 57. In this case, a relief recess 57e is provided at a mid part of the concave portion 57b. The material 55 flowing into the concave portion 57b presses the deepest part of the concave portion 57b so that the deepest part is likely to crack. With provision of the relief recess 57e, however, no pressure application to the deepest part of the concave portion occurs. There is no anxiety that the deepest part cracks.

A depth and a length of the concave portion 57b of the finishing die 57 are 0.05 to 0.15 mm and 0.5 to 1 mm, respectively. In this case, in a finishing work, an amount of material flowing in a direction substantially orthogonal to the pressing direction is satisfactorily balanced with the concave portion 57b for receiving the material in view of a magnitude of a pressing stroke. Accordingly, the material flow into the gaps 53b is optimized.

Figure 19:
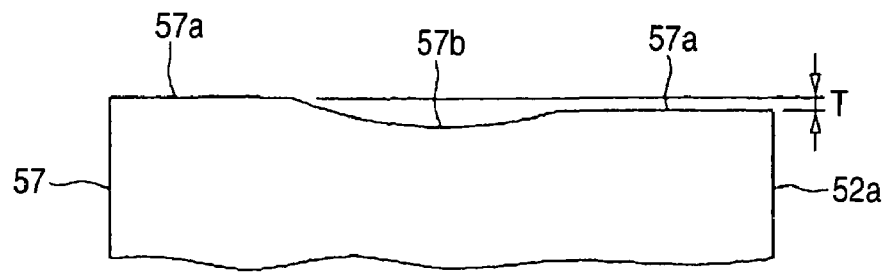
FIG. 19 is an enlarged view of a third modified example of the finishing female die.

FIG. 19 shows a third modified example of the finishing die 57 in which a height difference T is provided between the flat surfaces 57a. More specifically, one flat surface 57a which is placed at a portion to be closer to the communicating port 34 of the pressure generating chamber 29 is lower than the other flat surface 57a. Therefore, an amount of the material 55 pressed by the flat surface 57a closer to the communication port 34 is smaller than that of the material 55 pressed by the other flat surface 57a, so that a density or hardness of the material closer to the communication port 34 are lower than those of the other side. Accordingly, the work resistance acting on a punch used for forming of the communication port 34 is reduced, so that durability of the punch is improved, and this feature is advantageous in improving the working accuracy of the communication port 34.

A longitudinal width dimension of each projection 54 in the preforming die 56 and a width dimension of the finishing die 57 in a direction orthogonal to the elongated concave portion 57b are each equal to a longitudinal size of the pressure generating chamber 29.

Figure 20A:
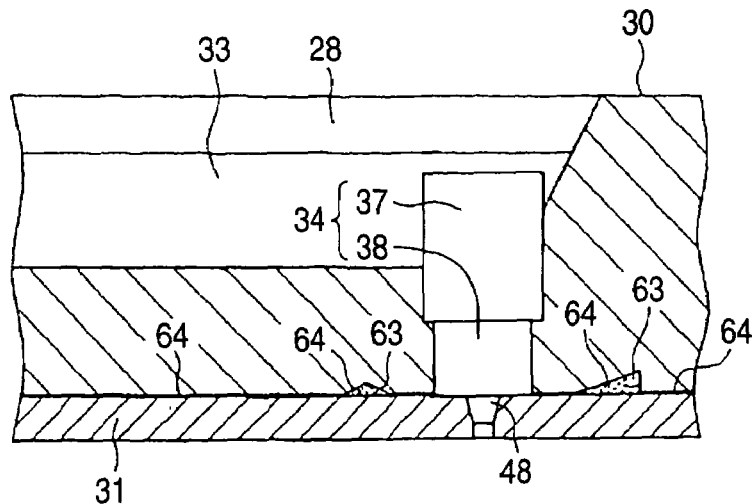
FIG. 20A is an enlarged section view showing an essential part of the chamber formation plate.

As shown in FIG. 20A, the chamber formation plate 30 and the nozzle plate 31 are joined together in a state that dents 63 are formed in the surface of the chamber formation plate 30, which is closer to the nozzle plate 31. There are many ways to arrange the dents 63. In this embodiment, as shown in FIG. 12, when the elongated recess portions 33 are temporarily formed, indentations to be the dents 63 are formed as the result of press-fitting of the projections 54. Actually, although those indentations by the projections 54 are groove-shaped, the shown dents are left at a location near the communication port 34 after the polish finishing step.

When the chamber formation plate 30 and the nozzle plate 31 are joined together by the adhesive 64, excessive adhesive 64 is received in the dents 63. Accordingly, a thickness of the adhesive layer 64 is optimized, so that the bonding strength between the chamber formation plate 30 and the nozzle plate 31 is increased.

Figure 20B:
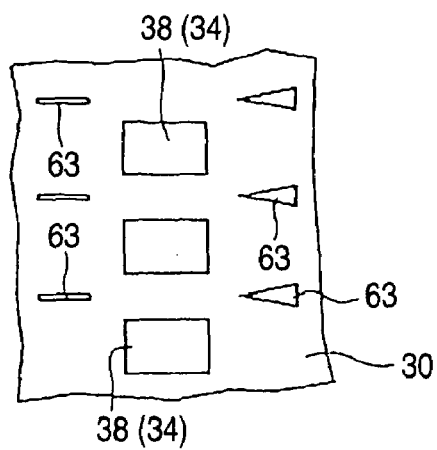
FIG. 20B is an enlarged plan view of the chamber formation plate obtained by using the preforming female arrangement shown in FIGS. 12B and 12C.
Figure 20C:
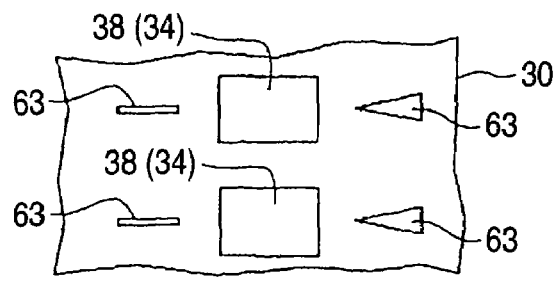
FIG. 20C is an enlarged plan view of the chamber formation plate obtained by using the preforming female arrangement shown in FIG. 12E.

FIG. 20B shows an arrangement of the dents 63 in a case where the projections 54 are arranged as shown in FIG. 12C. FIG. 20C shows an arrangement of the dents 63 in a case where the projections 54 are arranged as shown in FIG. 12E. In either case, a pitch of the dents 63 is substantially equal to that of the pressure generating chamber 29 (the elongated recess portions 33).

If the dents 63 are so arranged, the dents 63 are distributed at regular spatial intervals on the joining surface of the chamber formation plate 30, which is closer to the nozzle plate 31. As a result, the dents 63 uniformly receives the excessive adhesive 64, so that the thickness of the adhesive layer 64 is optimized over a broad area, and the bonding strength is increased. Further, since the dents 63 are each located near the opening of the communication port 34, no excessive adhesive 64 overflows into a passage space of the communication port 34. Accordingly, there is no chance that air bubbles stay at the locations where the adhesive overflows, and a good ink flow is secured.

Next, description will be given to the operation of the forging punch constituted by the first die 51a and the second die 52a.

FIG. 12B shows a state obtained immediately before the material (strip) 55 is pressurized between the first die 51a and the second die 52a. When the projections 54 are pressed into the material 55 as shown in FIGS. 12C and 12D, the material is caused to flow into the gaps 53b so that the partition wall 28 is preformed.

Incidentally, the second die 52a is provided with the concave portion 54a having a small height in a middle part. In portions 56b close to the ends of the second die 52a on both sides of the concave portion 54a (see FIG. 12D), an interval D1 between both of the dies 51a and 52a is smaller than an interval D2 between the middle parts thereof where the concave portion 54a is formed. In this narrow portion, the amount of the pressurization of the material is increased so that the material thus pressurized is caused to flow to be pushed out in a direction which is almost orthogonal to the direction of the pressurization. That is, the material is moved toward the concave portion 54a in which the amount of the pressurization is smaller. In other words, the concave portion 54a serves to provide a place into which the material 55 escapes. Such a material movement is mainly carried out in the longitudinal direction of the projections 53c or the gaps 53b, so that a part of the material 55 becomes a bulged portion 55a which is protruded into the concave portion 54a.

Furthermore, a much larger amount of the material 55 is positively pushed into the gaps 53b by the contribution of the sufficient height of the projections 54. In the partition wall 28 set in such a preforming state, lower portions 28a and a higher portion 28b are formed as shown in FIG. 12D. Such a difference in the height is made because a larger amount of the material 55 pressurized in the end portions 55b flows to the concave portion 54a while a large amount of the material 55 flows into the gaps 53b simultaneously.

Moreover, since the projections 53c are arranged at a predetermined pitch, the plastic flow of the material in the transverse direction of the projections 53c caused by the press-fitting operation is smoothly made uniform for both the direction of the flow and the amount of the flow.

Since the material 55 flowing into the gaps 53b as configured the above constitutes the partition wall 28 of the elongated recess portions 33, the shape of the elongated recess portion 33 can be formed accurately. For forming such a minute structure, an anisotropic etching method is generally employed. Since such a method requires a large processing man-hour, it is disadvantageous in respect of the manufacturing cost. On the other hand, if the forging punch is used for a metallic material such as nickel, the processing man-hour is considerably reduced. Furthermore, since the processing can be carried out with a uniform volume of each elongated recess portion 33, in a case where the pressure generating chamber of the liquid ejection head is to be formed, the ejection performance of the liquid ejection head is stabilized.

Since the concave portion 54a takes the shape of an arcuate concave portion, the height of the middle part of the second die is gradually changed. Consequently, the amount of the material 55 flowing into the gaps 53b becomes as uniform as possible in the longitudinal direction of the gaps 53b. In a case where the concave portion 54a is formed with a plurality of flat faces, it is possible to obtain the same effect by selecting the inclination angle of the sloped flat faces.

In a case where the convex portion 54b is provided in the middle part of the concave portion 54b, a plurality of concave portions 54a are defined so that portions in which the amount of the pressurization is large and portions in which the amount of the pressurization is small are alternately provided. Accordingly, the portions (corresponding to 56b) in which the amount of the pressurization is large and the concave portion 54a to which the material 55 is flown are alternately provided with small pitches. Consequently, the amount of the material 55 flowing to the gaps 53b is almost uniform in the longitudinal direction of the gaps 53b.

Since the concave portion 54a is formed in the mid part of the projection 54 in the longitudinal direction thereof, the material equally flows from both sides of the concave portion 54a. As a result, the flow amount of the material is made uniform over the entire length of the concave portion 54a. For example, in a case of forming the partitioning walls 28 of the pressure generating chambers 29, the partitioning walls 28 can be obtained with high accuracy.

By selecting a length of the concave portion 54a in the longitudinal direction of the projections 54 to be about ⅔ as large as a length of the projection 54, an amount of material flowing in a direction substantially orthogonal to the pressing direction is satisfactorily balanced with the size of the concave portion 54a for receiving the material in view of a magnitude of a pressing stroke. Accordingly, the material flow into the gaps 53b is optimized.

In a case where a ratio of the depth D of the concave portion 54a to the length L2 of the concave portion 54a is about 0.05 to 0.3 or a case where a ratio of the depth D of the concave portion 54a to the height H of the projections 54 is about 0.5 to 1, the above advantages can be obtained more surely.

Since at least the concave portion 54a of the projection 54 has a surface thereof finished smoothly by mirror finishing or chromium plating, the flow direction of the material 55 is positively changed toward the gaps 53b so that the flow of the material into the gaps 53b can be carried out more positively.

Figure 13B:
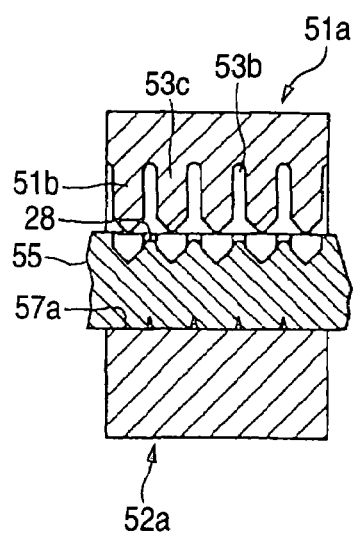
FIGS. 13B and 13C are sectional views showing a secondary molding.
Figure 13C:
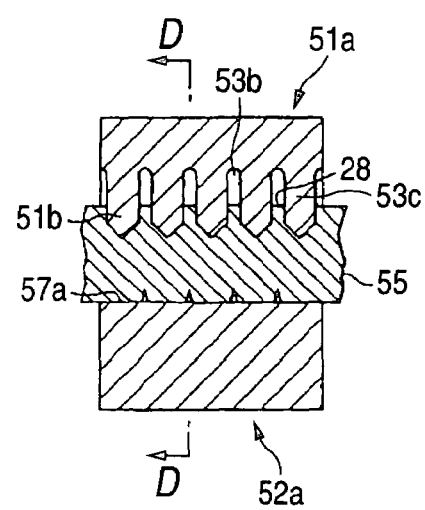
Figure 13D:
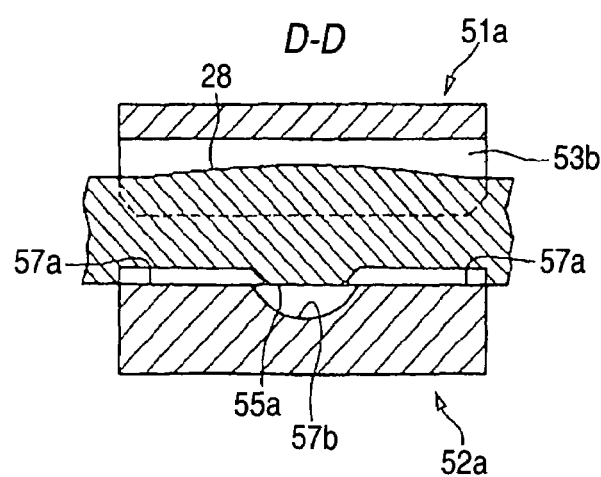
FIG. 13D is a sectional view taken along a line D—D in FIG. 13C.

When the primary molding shown in FIGS. 12C and 12D is completed, the material 55 is moved between the first die 51a and the finishing die 57 as shown in FIG. 13B, and is pressurized therein by both of the dies 51a and 52a as shown in FIG. 13C. The flat surfaces 57a increases the amount of the material 55 flowing into the gaps 53b so that the heights of the lower portions 28a are increased. Incidentally, since the bulged portion 55a is accommodated in the concave portion 57b and does not receive pressurizing force from the finishing die 57, the height of the higher portion 28b is rarely changed. Accordingly, the height of the partition wall 28 finally become almost uniform as shown in FIG. 13D.

In the finishing forming stage, since the slope faces 57c are formed, the amount of the material 55 flowing into each gaps 53b is caused to be as uniform as possible in all the gaps 53b. Namely, the material 55 flows in the arrangement direction of the projections 53 little by little from the central part of the array of the projections 53 toward the both ends thereof so that the vicinity of the ends of the material are made thick due to the accumulation of the plastic flow. Since the thick portions are pressurized by the slope faces 57c which are lowered, the material in the thick portions can be prevented from excessively flowing into the gaps 53b. Accordingly, the amount of the flow of the material 55 can be as uniform as possible in all the gaps 53b.

Since the projection 54 takes the shape of a wedge having a sharp tip (the wedge angle is 90 degrees or less), the wedge-shaped portion reliably cuts into the material 55 so that the material 55 in the portions opposed to the gaps 53b can be accurately pressurized and the flow of the material into the gaps 53b can be carried out reliably. Further, since the pitch of the projections 54 is set to be 0.3 mm or less, the pressure generating chamber of the liquid ejection head can be precisely fabricated by the forging punch.

The first die 51a and the second die 52a are fixed to an ordinary forging device (not shown), and the chamber formation plate 30 (the strip 55) is provided between both of the dies 51a and 52a so that the forging work is progressively carried out. Moreover, the second die 52a is constituted by the preforming die 56 and the finishing die 57 in pairs. Therefore, it is preferable that the preforming die 56 and the finishing die 57 are arranged adjacently to each other so that the chamber formation plate 30 (the strip 55) is sequentially moved.

Further, since the second die 52a includes the preforming die 56 which first operates to perform the primary molding, and the finishing die 57 which subsequently operates to perform the secondary molding, the forging work is efficiently performed in a progressive manner. Therefore, the positioning operation of the worked object in each stage can be precisely performed so that the molding accuracy is enhanced.

Figure 21:
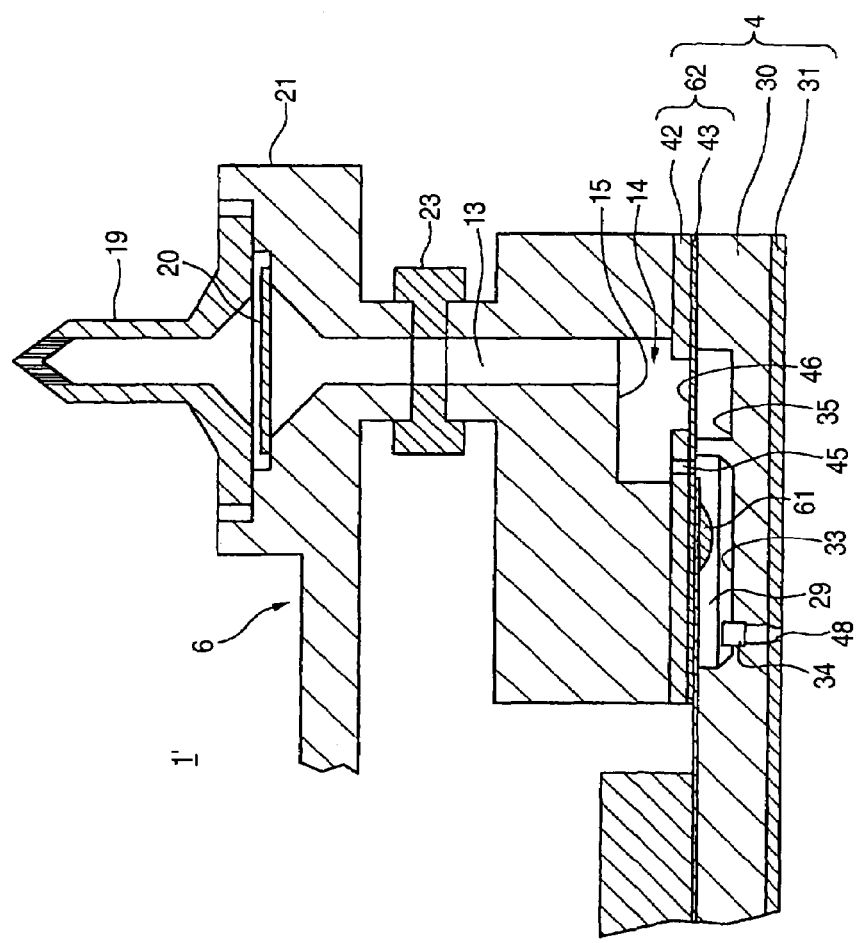
FIG. 21 is a sectional view for explaining an ink jet recording head according to a second example.

As a second example, a recording head 1' shown in FIG. 21 adopts a heat generating element 61 as the pressure generating element. According to the embodiment, in place of the elastic plate 32, a sealing board 62 provided with the compliance portion 46 and the ink supply port 45 is used and the side of the elongated recess portion 33 of the chamber formation plate 30 is sealed by the sealing board 62. Further, the heat generating element 61 is attached to a surface of the sealing board 62 at inside of the pressure generating chamber 29. The heat generating element 61 generates heat by feeding electricity thereto via an electric wiring.

Since other constitutions of the chamber formation plate 30, the nozzle plate 31 and the like are similar to those of the above-described embodiments, explanations thereof will be omitted.

In the recording head 1', by feeding electricity to the heat generating element 61, ink at inside of the pressure generating chamber 29 is bumped and bubbles produced by the bumping presses ink at inside of the pressure generating chamber 29, so that ink drops are ejected from the nozzle orifice 48.

Even in the case of the recording head 1', sins the chamber formation plate 30 is fabricated by plastic working of metal, advantages similar to those of the above-described embodiments are achieved.

With regard to the communicating port 34, although according to the above-described embodiments, an example of providing the communicating port 34 at one end portion of the elongated recess portion 33 has been explained, the invention is not limited thereto. For example, the communicating port 34 may be formed substantially at center of the elongated recess portion 33 in the longitudinal direction and the ink supply ports 45 and the common ink reservoirs 14 communicated therewith may be arranged at both longitudinal ends of the elongated recess portion 33. Thereby, stagnation of ink at inside of the pressure generating chamber 29 reaching the communicating port 34 from the ink supply ports 45 can be prevented.

Further, although according to the above-described embodiments, an example of applying the invention to the recording head used in the ink jet recording apparatus has been shown, an object of the liquid ejection head to which the invention is applied is not constituted only by ink of the ink jet recording apparatus but glue, manicure, conductive liquid (liquid metal) or the like can be ejected.

For example, the invention is applicable to a color filter manufacturing apparatus to be used for manufacturing a color filter of a liquid-crystal display. In this case, a coloring material ejection head of the apparatus is an example of the liquid ejection head. Another example of the liquid ejection apparatus is an electrode formation apparatus for forming electrodes, such as those of an organic EL display or those of a FED (Field Emission Display). In this case, an electrode material (a conductive paste) ejection head of the apparatus is an example of the liquid ejection head. Still another example of the liquid ejection apparatus is a biochip manufacturing apparatus for manufacturing a biochip. In this case, a bio-organic substance ejection head of the apparatus and a sample ejection head serving as a precision pipette correspond to examples of the liquid ejection head. The liquid ejection apparatus of the invention includes other industrial liquid ejection apparatuses of industrial application.

What is claimed is:

1. A punch for forging a metallic plate member, comprising:
   a first die, adapted to be opposed to a first face of the plate member;
   a second die, adapted to be opposed to a second face of the plate member;
   a plurality of first projections, provided on the first die and arranged in a first direction with a fixed pitch, each of the first projections being elongated in a second direction perpendicular to the first direction; and
   a plurality of second projections, provided on the second die and arranged in the first direction with the fixed pitch, each of the second projections being elongated in the second direction and provided with a concave portion extending in the second direction at a distal end portion thereof,
   wherein the plate member is sandwiched between the first die and the second die so that the first projections and the second projections are cut into the plate member in a third direction orthogonal to the first direction and the second direction, to perform a first forging work; and
   wherein a portion of each of the first projections that is first brought into contact with the plate member is entirely made flat.

2. The punch as set forth in claim 1, further comprising a third die, adapted to be opposed to the second face of the plate member on which the first forging work has been performed,
   wherein the plate member is sandwiched between the first die and the third die so that only the first projections are cut into the plate member in the third direction, to perform a second forging work.

3. The punch as set forth in claim 2, wherein:
   the third die is formed with a pair of third projections arranged in the second direction and elongated in the first direction so as to define a groove therebetween; and
   each of the third projections has a flat distal end face.

4. The punch as set forth in claim 3, wherein the concave portion in the second die and the groove in the third die are placed at a same position with respect to the plate member in connection with the second direction.

5. The punch as set forth in claim 3, wherein sloped flat faces continued from the flat distal end face are provided at both end portion in the first direction of each of the third projections, such that a portion closer to an end in the first direction of each of the third projections is more separated from the first die.

6. The punch as set forth in claim 3, wherein a depth of the groove falls within a range of 0.05 mm to 0.15 mm, and a length in the second direction of the groove falls within a range of 05 mm to 1 mm.

7. The forging punch as set forth in claim 2, wherein the second die and the third die are arranged such that the first forging work and the second forging work are performed in a progressive manner.

8. The punch as set forth in claim 1, wherein the second die is arranged such that each of the second projections is opposed to a gap defined between adjacent ones of the first projections.

9. The punch as set forth in claim 1, wherein the second die is arranged such that each of the second projections is opposed to an associated one of the first projections.

10. The punch as set forth in claim 1, wherein the concave portion is arranged at a center portion of each of the second projections with regard to the second direction.

11. The punch as set forth in claim 1, wherein the concave portion has an arcuate shape when viewed from the first direction.

12. The punch as set forth in claim 1, wherein the concave portion is formed with a plurality of flat faces.

13. The punch as set forth in claim 1, wherein a convex portion is formed on a bottom portion of the concave portion.

14. The punch as set forth in claim 13, wherein the convex portion has a height such an extent that a plurality of concave portions are substantially defined by the convex portion.

15. The punch as set forth in claim 1, wherein a recess portion is formed at a bottom portion of the concave portion.

16. The punch as set forth in claim 1, wherein a length of the concave portion in the second direction is $2/3$ or less of a length of each of the second projections in the second direction.

17. The punch as set forth in claim 1, wherein a ratio of a depth of the concave portion with respect to a length of the concave portion in the second direction falls within a range of 0.05 to 0.3.

18. The punch as set forth in claim 1, wherein a ratio of a depth of the concave portion with respect to a height of each of the second projections falls within a range of 0.5 to 1.

19. The punch as set forth in claim 1, wherein at least the concave portion of each of the second projections is finished with either mirror finishing or chromium plating.

20. The punch as set forth in claim 1, wherein each of the second projections has a wedge-shaped cross section when viewed from the second direction.

21. The punch as set forth in claim 20, wherein a distal end angle of the wedge-shaped cross section is 90 degrees or less.

22. The punch as set forth in claim 1, wherein the fixed pitch is 0.3 mm or less.

23. A forging apparatus comprising:
   a first die, adapted to be opposed to a first face of the plate member;
   a second die, adapted to be opposed to a second face of an plate member;
   a plurality of first projections, provided on the first die and arranged in a first direction with a fixed pitch, each of the first projections being elongated in a second direction perpendicular to the first direction;
   a plurality of second projections, provided on the second die and arranged in the first direction with the fixed pitch, each of the second projections being elongated in the second direction and provided with a concave portion extending in the second direction at a distal end portion thereof; and
   an actuator, operable to actuate at least one of the first die and the second to sandwich the plate member therebetween so that the first projections and the second projections are cut into the plate member in a third direction orthogonal to the first direction and the second direction,
   wherein a portion of each of the first projections that is first brought into contact with the plate member is entirely made flat.

* * * * *

UNITED STATES PATENT AND TRADEMARK OFFICE
CERTIFICATE OF CORRECTION

PATENT NO. : 6,997,027 B2  Page 1 of 1
APPLICATION NO. : 10/644091
DATED : February 14, 2006
INVENTOR(S) : Fujio Akahane et al.

It is certified that error appears in the above-identified patent and that said Letters Patent is hereby corrected as shown below:

Title Page  col. 1 after #65 Insert
(30) Foreign Application Priority Data
Aug. 20, 2002  (JP)................2002-239562
Aug. 19, 2003  (JP)................2003-295585

Signed and Sealed this

Twenty-second Day of August, 2006

JON W. DUDAS
*Director of the United States Patent and Trademark Office*